United States Patent
Yamada et al.

(10) Patent No.: US 9,979,811 B2
(45) Date of Patent: May 22, 2018

(54) CONTROLLER, CONTROL SYSTEM, AND METHOD FOR CONTROLLING CONTROL SYSTEM

(71) Applicant: Sharp Kabushiki Kaisha, Sakai, Osaka (JP)

(72) Inventors: Yuhsuke Yamada, Sakai (JP); Ataru Okura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days. days.

(21) Appl. No.: 15/300,941

(22) PCT Filed: Mar. 25, 2015

(86) PCT No.: PCT/JP2015/059078
§ 371 (c)(1),
(2) Date: Sep. 30, 2016

(87) PCT Pub. No.: WO2015/151953
PCT Pub. Date: Oct. 8, 2015

(65) Prior Publication Data
US 2017/0026507 A1    Jan. 26, 2017

(30) Foreign Application Priority Data
Apr. 3, 2014    (JP) .................. 2014-076968

(51) Int. Cl.
*H04M 1/725* (2006.01)
*G08C 17/00* (2006.01)
*F24F 11/00* (2018.01)
*G08C 17/02* (2006.01)
*H04L 12/28* (2006.01)

(52) U.S. Cl.
CPC ....... *H04M 1/72533* (2013.01); *F24F 11/006* (2013.01); *G08C 17/00* (2013.01); *G08C 17/02* (2013.01); *H04L 12/2818* (2013.01); *H04L 12/2834* (2013.01); *F24F 2011/0071* (2013.01)

(58) Field of Classification Search
CPC ............................. H04M 1/725; G08C 17/02
USPC ............................................. 709/202, 203
See application file for complete search history.

(56) References Cited

U.S. PATENT DOCUMENTS

| 2004/0044771 | A1* | 3/2004 | Allred ............... | H04L 29/125 709/227 |
| 2006/0080380 | A1* | 4/2006 | Aizu ................. | H04L 12/2803 709/203 |
| 2012/0080944 | A1* | 4/2012 | Recker .............. | H02J 9/02 307/25 |

FOREIGN PATENT DOCUMENTS

| JP | 2003-284162 A | 10/2003 |
| JP | 2003284162 A | * 10/2003 |

* cited by examiner

Primary Examiner — Kamran Afshar
Assistant Examiner — Farideh Madani
(74) Attorney, Agent, or Firm — ScienBiziP, P.C.

(57) ABSTRACT

A HEMS controller receives a control instruction of an electric appliance from a mobile terminal via a server and transmits the control instruction to the electric appliance. When no instruction is given from the mobile terminal, the HEMS controller judges whether communication with the server is continued. When judging that communication is not continued, the HEMS controller transmits, to the electric appliance, a control signal for turning off power of the electric appliance.

11 Claims, 22 Drawing Sheets

CONTROLLER, CONTROL SYSTEM, AND METHOD FOR CONTROLLING CONTROL SYSTEM

TECHNICAL FIELD

The present disclosure relates to a controller for transmitting a control signal to an electric appliance and a control system including the controller.

BACKGROUND ART

Conventionally, a technique of remotely operating an appliance to be controlled, such as an air conditioner, by means of radio communication with use of a mobile terminal such as a smartphone has been proposed. For example, Japanese Unexamined Patent Application Publication No. 2003-284162 discloses that an operation mode of an appliance to be controlled is changed according to whether or not connection of radio communication between the appliance to be controlled and a mobile terminal is established.

CITATION LIST

Patent Literature

PTL 1: Japanese Unexamined Patent Application Publication No. 2003-284162

SUMMARY OF INVENTION

Technical Problem

In a technique disclosed in Japanese Unexamined Patent Application Publication No. 2003-284162, however, it is assumed that a user of the mobile terminal performs control for the appliance to be controlled only in a range in which direct radio communication with the appliance to be controlled is allowed. On the other hand, the user of the mobile terminal may desire to perform control for the appliance to be controlled by using the mobile terminal even in a case where the use is to be conducted at a place, such as a going-out place, where the mobile terminal is not allowed to perform direct radio communication with the appliance to be controlled.

The disclosure has been made in view of such circumstances and an object thereof is to further widen a geographical range in which a mobile terminal is able to transmit an instruction of control to an appliance to be controlled.

Solution to Problem

According to one aspect, a controller for transmitting a control signal to an electric appliance is provided. The controller includes a communication unit for receiving, from a server, an instruction to the electric appliance, which is transmitted from a mobile terminal; a storage unit for storing the control signal to the electric appliance; and a processor. The processor is configured to transmit an instruction to the electric appliance, which is received from the communication unit, to the electric appliance, and when judging that connection with the server is not continued, transmit, to the electric appliance, a control signal which is stored in the storage unit and corresponds to a specific state of the electric appliance.

Preferably, the processor is configured to transmit the control signal corresponding to the specific state to the electric appliance on condition that a state in which connection with the server is not continued is maintained for a fixed time or more.

Preferably, the processor is configured to, when judging that connection with the server is not continued, transmit the control signal corresponding to the specific state to the electric appliance on condition that a state of the electric appliance is a state in accordance with the instruction transmitted from the server via the processor.

Preferably, the specific state is a state in which power supply from outside to the electric appliance is turned off.

According to another aspect, a control system including a server; a mobile terminal capable of communication with the server; and a controller for transmitting a control signal to an electric appliance based on an instruction received via the server is provided. The mobile terminal is configured to transmit an instruction to the electric appliance. The server is configured to transmit, to the controller, the instruction received from the mobile terminal. The controller is configured to transmit the instruction to the electric appliance, which is received from the server, to the electric appliance, and when judging that connection with the server is not continued, transmit a control signal corresponding to a specific state to the electric appliance.

According to still another aspect, a method for controlling a control system which includes a server, a mobile terminal capable of communication with the server, and a controller for transmitting a control signal to an electric appliance based on an instruction received via the server is provided. The mobile terminal is configured to transmit an instruction to the electric appliance. The server is configured to transmit, to the controller, the instruction received from the mobile terminal. The method for controlling a control system includes a step in which the controller transmits the instruction to the electric appliance, which is received from the server, to the electric appliance, a step in which the controller judges whether connection with the server is continued, and a step in which the controller, when judging that connection with the server is not continued, transmits a control signal corresponding to a specific state to the electric appliance.

Advantageous Effects of Invention

According to the disclosure, a controller receives an instruction to an electric appliance, which is an appliance to be controlled, from a mobile terminal via a server. When determining that communication with the server is not continued, the controller returns the electric appliance to a specific state.

Thereby, the mobile terminal is able to transmit the instruction of control to the electric appliance by performing communication with the server without performing direct communication with the controller. Note that, when the controller is not able to receive the instruction from the mobile terminal because communication with the server is not continued, the controller returns the electric appliance to a specific state, thus making it possible to ensure safety of the electric appliance and an environment in which the electric appliance is installed.

DESCRIPTION OF EMBODIMENTS

Figure 1:
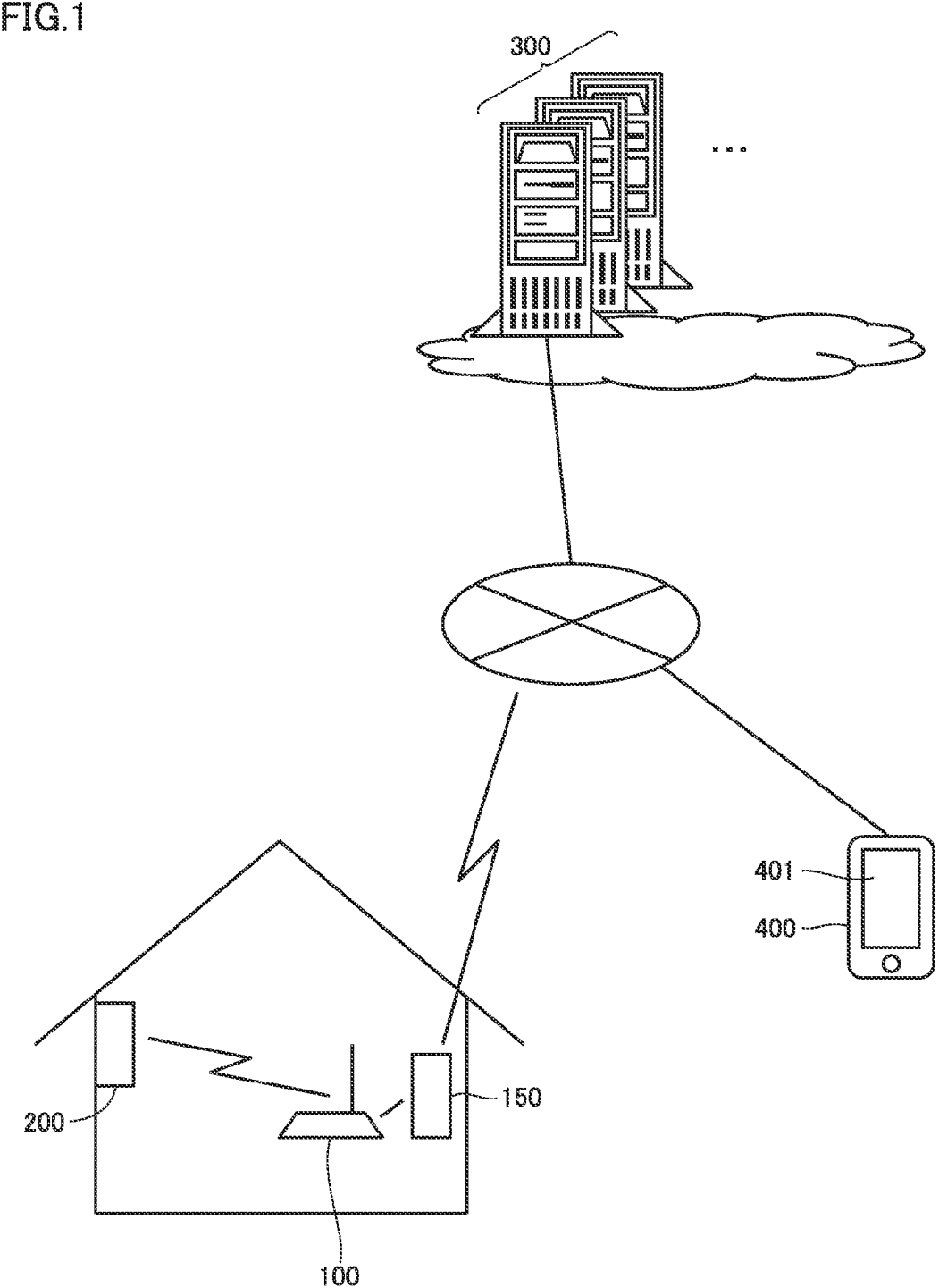
FIG. 1 illustrates a specific example of a configuration of a first embodiment of a control system.

In a control system of the disclosure, a controller (HEMS controller 100 described below) receives an instruction to an electric appliance (electric appliance 200 described below) from a server (server 300 described below). When judging that connection with the server is not continued, the controller transmits a control signal corresponding to a specific state of the electric appliance to the electric appliance. The specific state is, for example, a state in which the electric appliance or an environment in which the electric appliance is installed is safe, and a specific example thereof includes a state in which an operation state of the electric appliance is turned off (power is turned off).

Embodiments of the disclosure will hereinafter be described with reference to the drawings. In the following description, the same components are denoted by the same reference numerals. They have the same names and functions. Therefore, detailed description thereof will not be repeated.

First Embodiment

<1. System Configuration>

FIG. 1 illustrates a specific example of a configuration of a first embodiment of a control system. With reference to FIG. 1, the control system is a system for controlling the electric appliance 200. The control system includes the server 300, the HEMS controller 100, and a broadband router 150. The HEMS controller 100 and the broadband router 150 relay communication between the electric appliance 200 and the server 300 via the Internet. More specifically, the HEMS controller 100 is connected to a network via the broadband router 150 to communicate with the server 300 via the network. In the following description, what the HEM controller 100 communicates (is connected) with the server 300 via the broadband router 150 is simply referred to as "the HEMS controller 100 communicates (is connected) with the server 300".

The electric appliance 200 is, for example, an air conditioner (or lighting equipment or a water heater) for home or office use. Note that, though only one electric appliance 200 is illustrated in FIG. 1, a plurality of (a plurality of types of) electric appliances 200 can exist in the control system according to the first embodiment.

The server 300 may be constituted by apparatuses which are positioned at a plurality of points and function in cooperation with each other to perform processing described below by sharing the processing, or may be constituted by one apparatus positioned at one point. Moreover, the server 300 may be constituted by one apparatus or may be constituted by a plurality of apparatuses. The server 300 is configured by, for example, a typical computer.

The server 300 receives an access from a mobile terminal 400 via the network. The mobile terminal 400 is, for example, a smartphone or a tablet terminal. The mobile terminal 400 includes a touch panel 401 as one example of an input apparatus and/or a display apparatus.

The HEMS controller 100 is able to communicate with a plurality of electric appliances 200. Each of the HEMS controller 100 and the electric appliance 200 is connected to the broadband router 150, and forms the same subnet (network segment). The broadband router 150 has at least a connection function by a wired LAN (Local Area Network) and is connected to the HEMS controller 100 with the wired LAN. Preferably, the broadband router 150 further includes a wireless LAN function, and is connected to one or more electric appliances 200 via the wireless LAN (or the wired LAN). The HEMS controller 100 is able to be connected to one or more electric appliances 200 (via the broadband router 150). The HEMS controller 100 is able to be connected to the Internet (via the broadband router 150) and communicates with the server 300 via the Internet.

<2. Configuration of HEMS Controller>

Figure 2:
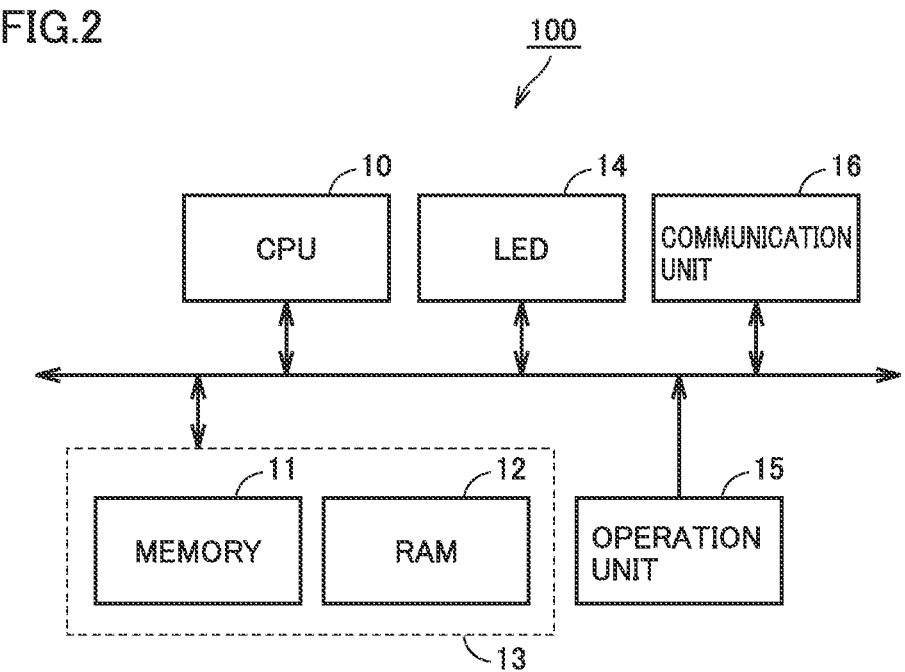
FIG. 2 illustrates one example of a hardware configuration of a HEMS (Home Energy Management System) controller.

FIG. 2 illustrates one example of a hardware configuration of the HEMS controller 100. With reference to FIG. 2, the HEMS controller 100 includes a CPU (Central Processing Unit) 10 for controlling the HEMS controller 100, and a storage device 13. The storage device 13 includes a memory 11 and a RAM (Random Access Memory) 12, for example. The memory 11 is constituted by, for example, a flash memory, and stores a program executed in the CPU 10. The RAM 12 stores various data such as state information of an electric appliance as described below, and serves a working area when the program is executed by the CPU 10.

The HEMS controller 100 may include an LED (Light Emitting Diode) 14 as an output unit and an operation unit 15 as an input unit. The operation unit 15 is, for example, a hardware button such as a switch, and/or a software button displayed on a display.

Further, the HEMS controller 100 includes a communication unit 16 for performing communication with the electric appliance 200 and the broadband router 150 through the wireless LAN (or the wired LAN). The communication unit 16 is realized by a communication interface, for example, such as, a LAN card.

A device configuration of the HEMS controller 100 is not limited to the configuration of FIG. 2. For example, the HEMS controller 100 may have a portion for communication with the electric appliance 200 and the other portion separated from each other, and be realized when these portions are connected so as to allow communication by using a communication circuit such as a UART (Universal Asynchronous Receiver Transmitter).

Figure 3:
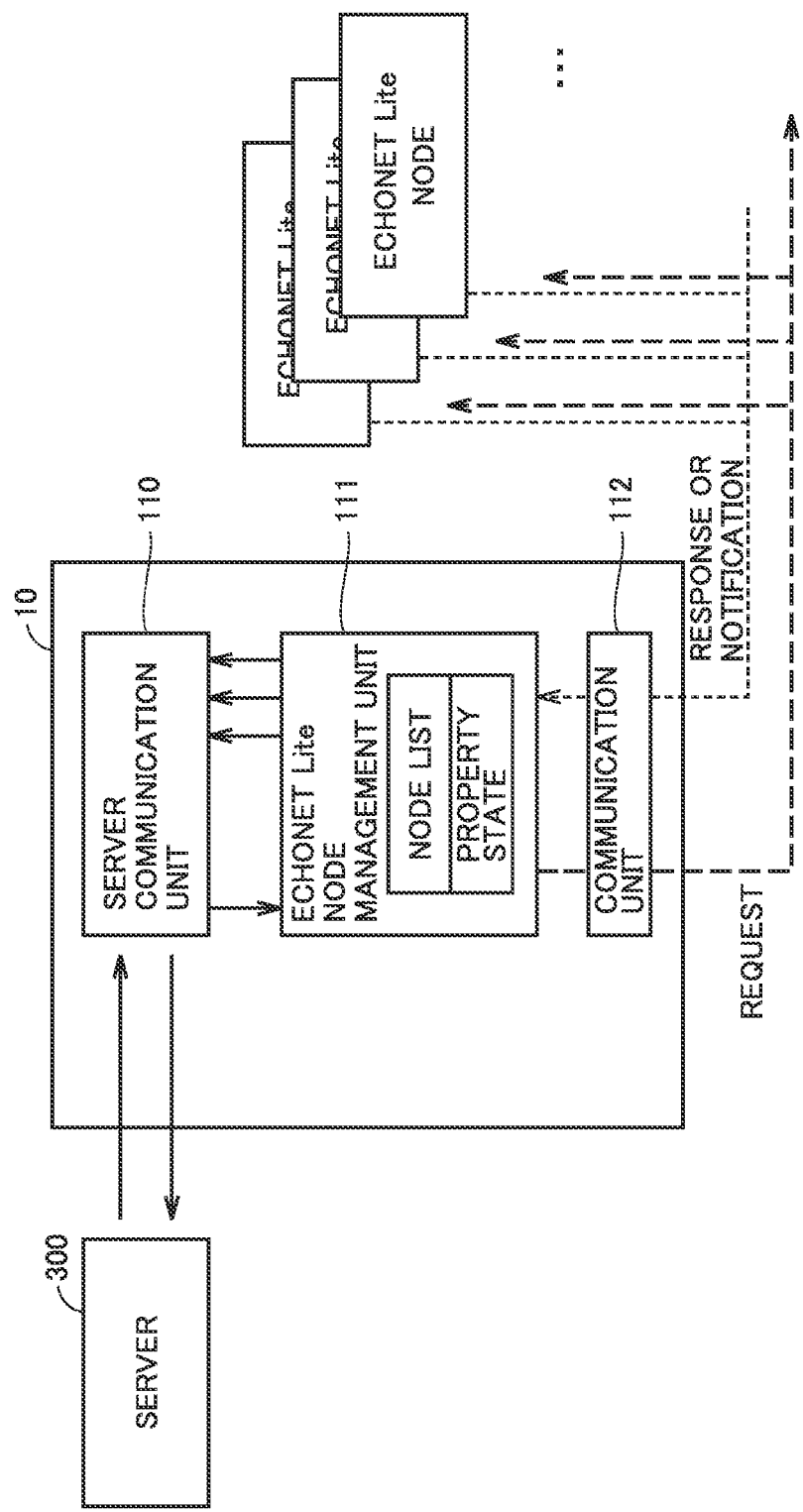
FIG. 3 schematically illustrates one example of a control configuration of the HEMS controller.

FIG. 3 schematically illustrates one example of a control configuration of the HEMS controller 100. The control configuration of FIG. 3 is mainly realized by the CPU 10 which reads and executes the program stored in the storage device 13. However, a part of the configuration illustrated in FIG. 3 may be realized by other components of the HEMS controller 100.

With reference to FIG. 3, the control configuration of the HEMS controller 100 schematically includes a server communication unit 110 for controlling communication with the server 300, an ECHONET Lite (registered trademark) node management unit 111, and a communication unit 112 for controlling communication with an ECHONET Lite node (electric appliance 200).

The ECHONET Lite node management unit 111 monitors a state of "state change announce property" on each instance and a state of "server notification property" designated from the server 300.

The "state change announce property" refers to property announced from an appliance when there is a change. Details of the property are prescribed by the ECHONET Lite standard. The "state change announce property" is prescribed by the ECHONET Lite standard for each instance. When a new instance is detected, the ECHONET Lite node management unit 111 acquires a state change announce property map (EPC=0×9D) prescribed by the ECHONET Lite standard and creates a list of the state change announce property.

The "server notification property" refers to property to be notified to the server 300. The ECHONET Lite node management unit 111 creates a list of the "server notification property" according to designation from the server 300. An initial value of the "server notification property" is empty.

Upon reception of INF notification about property of the state change announce property from the ECHONET Lite node, the ECHONET Lite node management unit 111 performs notification to the server communication unit 110. In addition, the ECHONET Lite node management unit 111 holds a latest value of the property subjected to the notification.

The ECHONET Lite node management unit 111 acquires property (monitor property) derived as a union of the state change announce property and the server notification property. When detecting that there is a change in a value of the monitor property, the ECHONET Lite node management unit 111 performs notification to the server communication unit 110. This notification means that the state change announce property or the server notification property has changed. Further, this notification also includes information (one byte) indicating whether or not the server notification property is included.

Upon reception of the notification from the ECHONET Lite node management unit 111, the server notification unit 110 judges whether the server notification property is included in the property subjected to the notification. When the server notification property is included, the server notification unit 110 notifies the server 300 of one included in the server notification property in the received notification.

When detecting either following (1) or (2), the ECHONET Lite node management unit 111 transmits "INF notification of individual ECHONET Lite instance" to all clients of transmission sources that have been authenticated. This is not a response to a command, but notification which is non-periodically executed by the ECHONET Lite node management unit 111.

(1) Reception of state change announce (INF).

(2) There is a change in a value of monitor property of an ECHONET Lite instance.

Whichever of (1) or (2) is detected, the ECHONET Lite node management unit 111 notifies all the clients of transmission sources that have been authenticated of the received property as a "notification ECHONET Lite telegram (ESV=0×73)".

Though the property of the "INF notification of individual ECHONET Lite instance" has one to be notified and one not to be notified to the server mixed, the server communication unit 110 is able to judge whether or not to perform notification to the server 300 based on a value of the information (one byte) indicating whether or not the server notification property is included.

When receiving a request of a "setting command of server notification property", the ECHONET Lite node management unit 111 sets the server notification property in the ECHONET Lite node management unit 111. The server 300 is able to designate an instance which is desired to be set and further designate property to be notified to the server 300.

<3. Configuration of Server>

Figure 4:
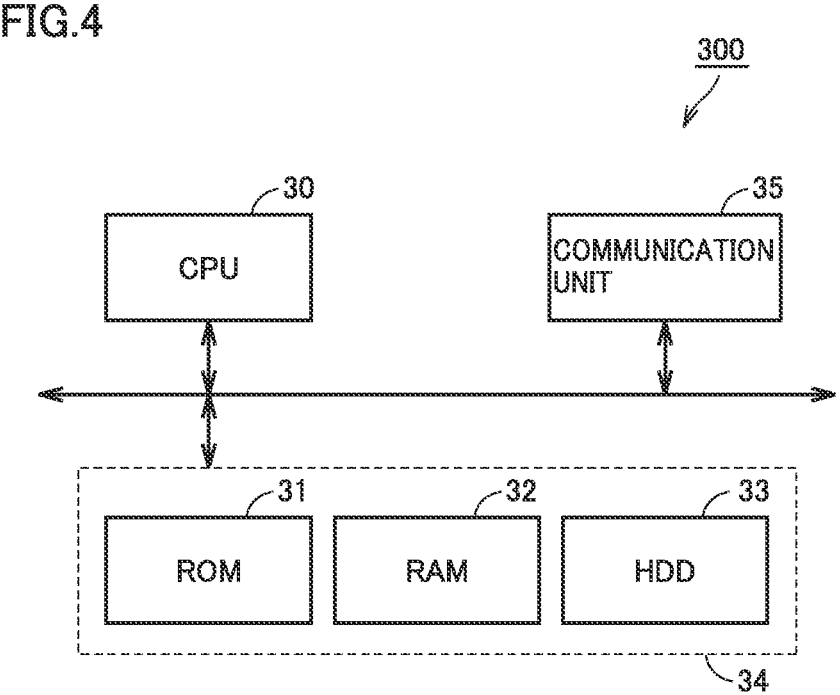
FIG. 4 is a block diagram schematically illustrating one example of a device configuration of a server.

FIG. 4 is a block diagram schematically illustrating one example of a device configuration of the server 300. With reference to FIG. 4, the server 300 includes a CPU 30 for controlling a whole of the server 300, a memory 34, and a communication unit 35 for performing communication via the Internet. The memory 34 includes, for example, a ROM 31, a RAM 32, and a HDD (Hard Disk Drive) 33. The ROM 31 stores a program executed by the CPU 30. The RAM 32 serves as a working area when the program is executed by the CPU 30, and stores a calculated value. The HDD 33 is one example of a secondary storage device.

As described above, the server 300 may be configured by a typical computer. Therefore, FIG. 4 illustrates a schematic configuration of a typical computer. The configuration of the server 300 is not limited to the configuration of FIG. 4. For example, the server 300 may further include an operation unit or a display for receiving an operation input by a user. Further, when the server 300 is constituted by a plurality of apparatuses as described above, each of the plurality of apparatuses may further include a communication device for performing communication with each other.

<4. Configuration of Electric Appliance>

Figure 5:
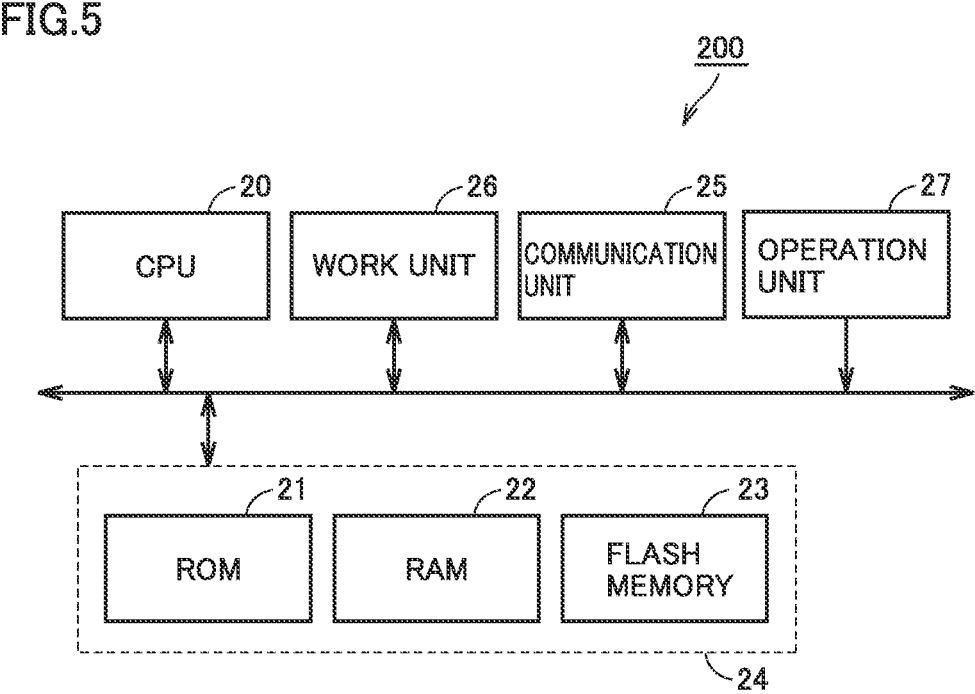
FIG. 5 is a block diagram schematically illustrating one example of a device configuration of an electric appliance.

FIG. 5 is a block diagram schematically illustrating one example of a device configuration of the electric appliance 200. With reference to FIG. 5, the electric appliance 200 includes a CPU 20 for controlling a whole of the electric appliance 200, a memory 24, and a communication unit 25 for performing communication with the HEMS controller 100. The memory 24 includes, for example, a ROM 21, a RAM 22, and a flash memory 23. The ROM 21 stores a program executed by the CPU 20. The RAM 22 serves as a working area when the program is executed by the CPU 20, and stores a calculated value. The HDD 23 is one example of a secondary storage device.

The electric appliance 200 further includes a work unit 26. The work unit 26 is a working portion for exerting a unique function of the electric appliance 200. As one example, when the electric appliance 200 is an air conditioner, the work unit 26 includes components for generating conditioned air, such as a fan and a compressor. As another example, when the electric appliance 200 is a television, the work unit 26 includes components for outputting content, such as a receiver and a display for a television signal.

The electric appliance 200 further includes an operation unit 27. The operation unit 27 is, for example, a hardware button such as a switch and/or a software displayed on a display. The CPU 20 receives an input of a signal according to an operation to the operation unit 27. The operation unit 27 also includes a remote controller for directly transmitting a control signal by infrared ray or the like to the electric appliance 200. In the control system, control from the mobile terminal 400 via a network and direct control from the operation unit 27 (remote controller) are referred to in a distinguishable manner.

<5. Operation Outline>

The control system according to the first embodiment is used for remotely operating the electric appliance 200, such as an air conditioner for home or office use, by using the mobile terminal 400. A user of the mobile terminal 400 starts an application for a remote operation on the mobile terminal 400 to display an image for an operation on the touch panel 401. When the user performs, for example, a touch operation on the mobile terminal 400 to the touch panel 401 on which the image is displayed, the mobile terminal 400 outputs an instruction for acquiring a current state of the electric appliance 200 and/or a control instruction to the electric appliance 200.

In the control system, the control instruction transmitted from the mobile terminal 400 is transmitted to the electric appliance 200 via the server 300 and the HEMS controller 100. Here, schematic description for an operation outline of each component in the control system will be given.

<6. Operation Outline when No Instruction is Given from Mobile Terminal 400 (1)>

Figure 6:
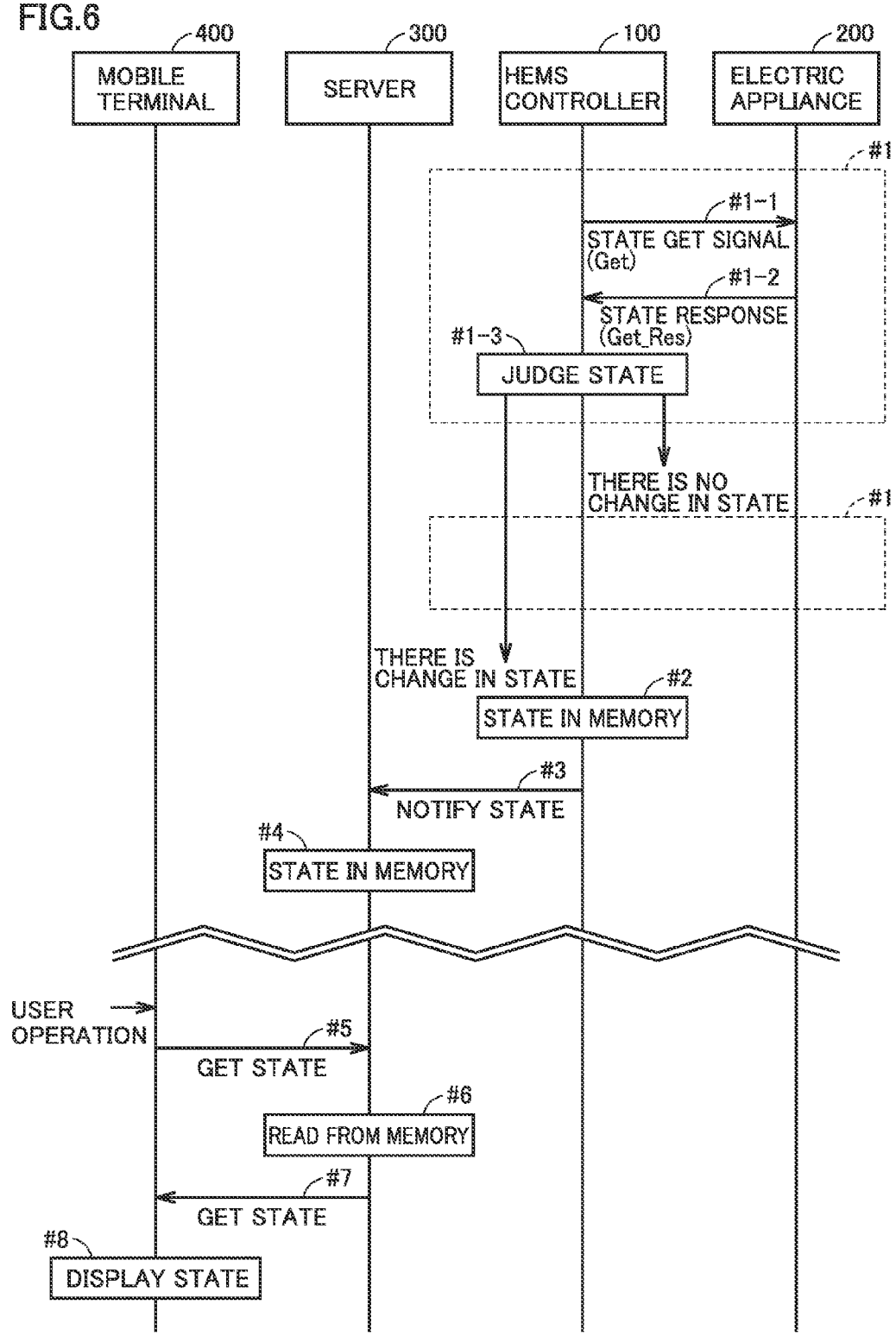
FIG. 6 illustrates one example of an operation outline in the control system when no instruction is given from a mobile terminal.

FIG. 6 illustrates one example of an operation outline in the control system when no instruction is given from the mobile terminal 400. FIG. 6 illustrates one example of a flow of signals between the components in the control system.

With reference to FIG. 6, in a time period during which no instruction is given from the mobile terminal 400, the HEMS controller 100 gets a state of the electric appliance 200 at a predefined frequency (step #1). As an example of the operation of getting the state, the HEMS controller 100 inquires the state by transmitting a state get signal (Get) to the electric appliance 200 (#1-1), and receives a response (Get_Res) thereto from the electric appliance 200 (step #1-2). As another example, the HEMS controller 100 receives state change announce notification (INF) from the electric appliance 200. The state change announce notification (INF) is notification transmitted by the electric appliance 200 when there is a change in the state of the electric appliance 200.

The state of the electric appliance 200 includes on/off of the electric appliance 200, an operation amount which is set (such as temperature, humidity, or illumination), power consumption in a prescribed time period, whether or not a timer is set and a time thereof, and the like.

In the control system of the first embodiment, when receiving the state response from the electric appliance 200, the HEMS controller 100 judges whether or not the state is changed from a state of the electric appliance 200, which is stored in the memory of the HEMS controller 100 (step #1-3). When there is a change, the HEMS controller 100 stores the state in the memory 11 (step #2) and notifies the server 300 of the state of the electric appliance 200 (step #3).

When there is no change, the HEMS controller 100 does not notify the server 300. In this case, the getting of the state of the electric appliance 200 is repeated at the prescribed frequency (for example, at an interval of a time t1).

The server 300 which has received the notification stores the state notified as a latest state of the electric appliance 200 in the memory of the server 300 (step #4).

When the operations of steps #1 to #4 above are repeated, the current state of the electric appliance 200 is stored in the server 300. In the control system, only when there is a change in the state of the electric appliance 200, notification to the server 300 is performed from the HEMS controller 100. That is, communication between the server 300 and the HEMS controller 100 via the Internet is performed only when there is a change in the state of the electric appliance 200. When there is no change in the state of the electric appliance 200 even when the state is got at step #1, communication between the server 300 and the HEMS controller 100 via the Internet is not performed. Thus, it is possible to remarkably reduce an amount of communication via the Internet compared to a method for notifying the server 300 of the state of the electric appliance 200 each time the state is got at step #1 is performed.

The mobile terminal 400 is able to display the current state of each of the plurality of electric appliances 200 on the touch panel 401. For example, when a program for a remote operation is started, the mobile terminal 400 displays an image for the operation on the touch panel 401, inquires the server 300 about the state of each of the electric appliances 200, which are registered in advance, and then displays an image for operating each of the electric appliances 200 on the touch panel 401. When the predetermined operation is performed, the mobile terminal 400 inquires the server 300 about the state of each of the electric appliances 200 and updates the display on the touch panel 401 so that a result thereof is displayed.

When receiving the instruction to get the state of the electric appliance 200 as described above from the user, the mobile terminal 400 accesses the server 300 to request getting of the state (step #5). In response to this request, the server 300 reads information indicating the current state of the corresponding electric appliance 200 from the memory of the server 300 (step #6), and performs notification to the mobile terminal 400 (step #7). In accordance with execution of the application, the mobile terminal 400 displays the state of the electric appliance 200 in an image for the operation based on the notified state of the electric appliance 200 (step #8). This makes it possible for the user to remotely know the current state of the electric appliance 200 with use of the mobile terminal 400.

Figure 7:
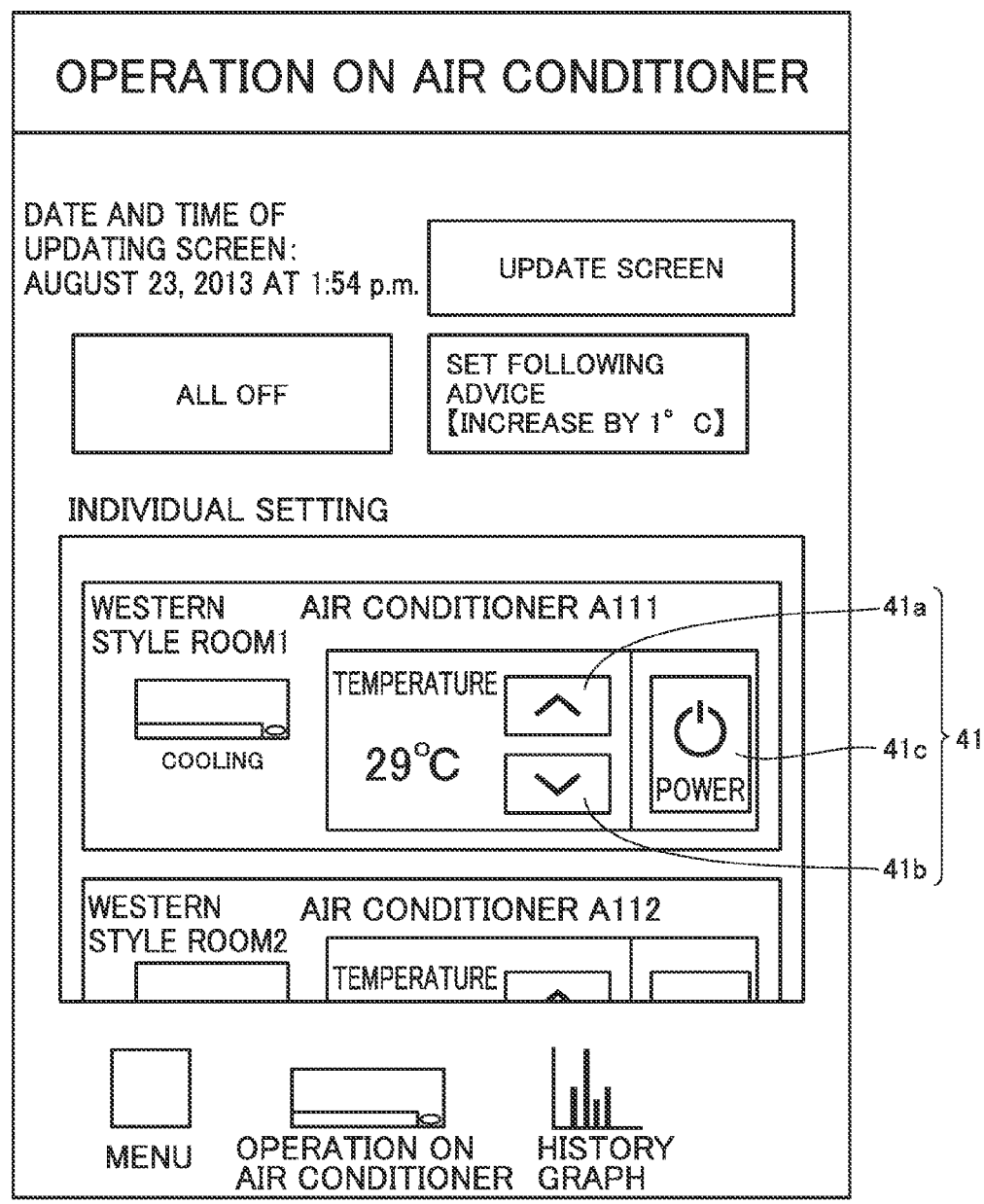
FIG. 7 illustrates one example of an image for an operation, which is displayed on a touch panel of the mobile terminal.

FIG. 7 illustrates one example of an image for an operation, which is displayed on the touch panel of the mobile terminal 400. In the image of FIG. 7, as one example of the current state of the electric appliance 200, "29° C." is indicated as a set temperature of an air conditioner ("air conditioner" having an ID "A111" in FIG. 7) installed in a western style room 1.

The image of FIG. 7 includes an operation button 41 for giving a control instruction for the electric appliance 200 which is registered in advance, for example, such as an air conditioner. In the example of FIG. 7, the operation button 41 includes buttons 41a and 41b for performing temperature setting for the air conditioner and a power button 41c. Control using the operation button 41 will be described below.

<7. Operation Outline when No Instruction is Given from Mobile Terminal 400 (2)>

Figure 8:
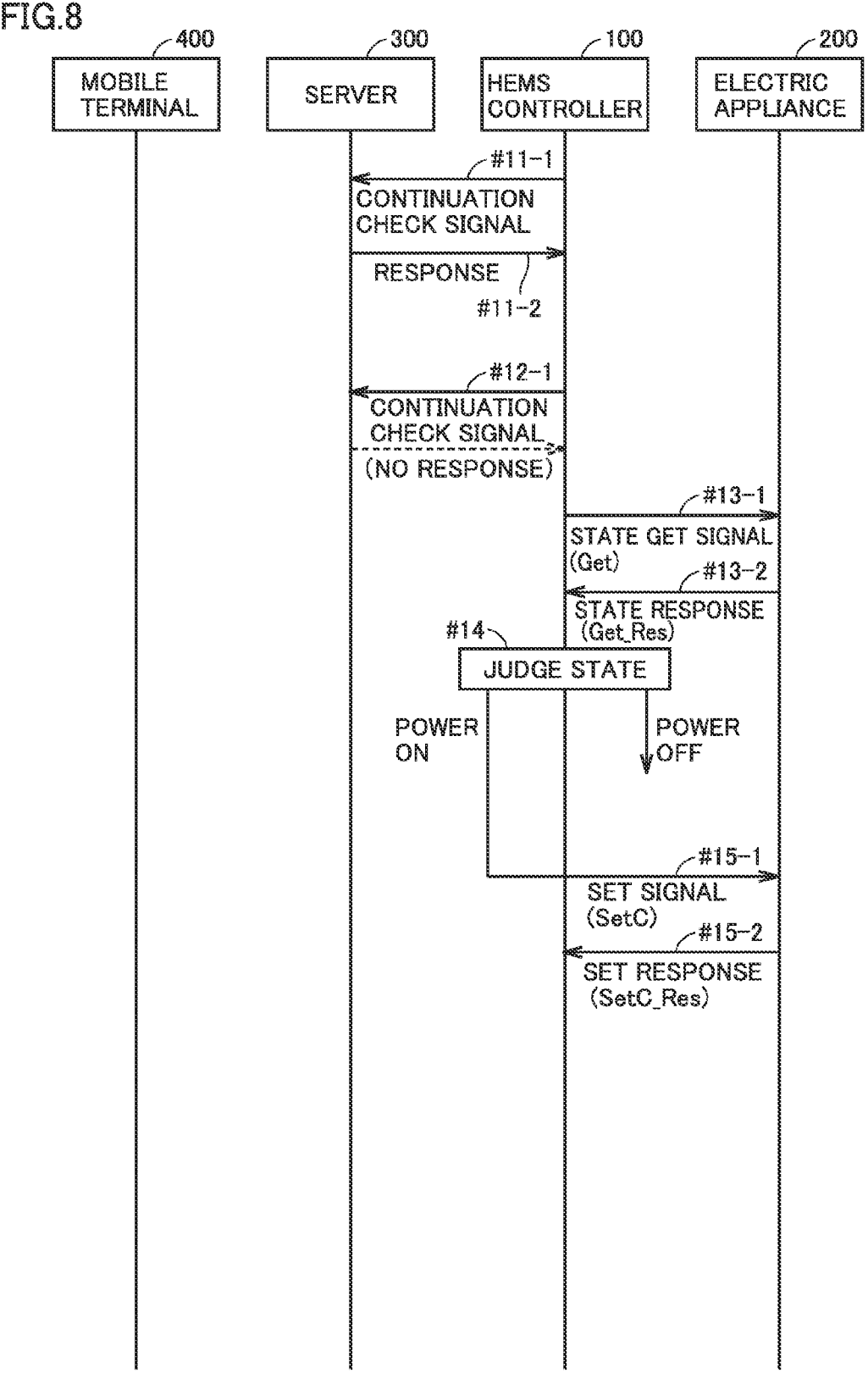
FIG. 8 illustrates another example of an operation outline in the control system when no instruction is given from the mobile terminal.

FIG. 8 illustrates another example of an operation outline in the control system when no instruction is given from the mobile terminal 400. Processing of FIG. 8 can be carried out concurrently with the processing of FIG. 6 or at a timing shifted from a timing of the processing of FIG. 6.

In the control system of the present embodiment, when no instruction is given from the mobile terminal 400, the HEMS controller 100 judges whether connection for communication with the server 300 is continued. The "connection for communication" is also simply referred to as "connection" below. When judging that connection for communication is not continued, the HEMS controller 100 transmits, to the electric appliance 200, a control signal for turning off the operation state (for example, turning off power) of the electric appliance 200.

As one example of the state in which the electric appliance 200 and/or the environment in which the electric appliance 200 is installed are made safe, an operation state of the electric appliance 200 is turned off. For example, in a case where the electric appliance 200 is an air conditioner, when power of the air conditioner is turned off, it is possible to reduce a risk of an erroneous operation or the like of the air conditioner, thus making it possible to bring the air conditioner and the environment in which the air conditioner is installed into a safe state.

In a case where the electric appliance 200 is lighting equipment, when an operation state of the electric appliance 200 is turned off, heat generation due to lighting of the lighting equipment is able to be suppressed. The lighting equipment may be lit with predetermined illumination instead of turning off the power of the lighting equipment. When the lighting illumination is lit with the predetermined illumination, it is possible to produce presence of a person in a room in which the lighting equipment is installed. This makes it possible to reduce a risk about an intrusion of a sneak thief into the room, or the like. In both cases, it is possible to bring the environment in which the lighting equipment is installed into a safe state.

A control signal for bringing each of the electric appliances 200 into a specific state is stored in the memory 11 of the HEMS controller 100. To each of the electric appliances 200, the HEMS controller 100 transmits the control signal for bringing into a specific state, which is a control signal associated with the corresponding electric appliance 200.

Judgement of whether or not connection with the server 300 is continued by the HEMS controller 100 is executed periodically, for example, at a predetermined time interval. Note that, this judgment may be executed on the condition that a predetermined event occurs in the HEMS controller 100.

The processing flow above will be described in more detail with reference to FIG. 8.

The HEMS controller 100 transmits a signal for checking continuation of connection (continuation check signal) to the server 300 (step #11-1). In response thereto, the server 300 transmits a response signal to the HEMS controller 100 (step #11-2). When receiving the response signal, the HEMS controller 100 waits until a transmission timing of a next continuation check signal comes.

When not receiving a response signal from the server 300 within a predefined time after transmitting the continuation check signal to the server 300 (step #12-1), the HEMS controller 100 transmits a state get signal (Get) to the electric appliance 200 (step #13-1). In response thereto, the electric appliance 200 transmits a response (Get_Res) to the HEMS controller 100 (step #13-2).

Then, the HEMS controller 100 judges whether the state of the electric appliance 200 is in a state in which a control signal for performing control to bring into the aforementioned specific state is to be transmitted (step #14). The judgment at step #14 is performed based on the response (Get_Res) received from the electric appliance 200.

In the example illustrated in FIG. 8, the "specific state" is turning off of the power. Then, whether or not the power of the electric appliance 200 is turned on is judged at step #14. The state in which the power is turned on is one example of the "state in which a control signal for performing control to bring into the specific state".

When it is judged that the state of the electric appliance 200 is in the "state in which the power is turned on", the HEMS controller 100 transmits a control signal for turning off the power to the electric appliance 200 (step #15-1). In FIG. 8, this control signal is indicated as a "set signal (SetC) for performing setting (C)". When receiving the control signal, the electric appliance 200 returns a signal indicating that the control signal has been received (SetC_Res) to the HEMS controller 100 (step #15-2). Thereby, the electric appliance 200 is shifted to the state in which the power is turned off by blocking power supply to the electric appliance 200.

On the other hand, when judging that the state of the electric appliance 200 is in the "state in which the power is turned off", the HEMS controller 100 waits without transmitting the control signal as indicated with step #15-1.

<8. Operation Outline when Mobile Terminal 400 Transmits Instruction>

Next, with reference to FIG. 7 and FIG. 9 to FIG. 14, description will be given for an operation outline of each component in a control system when an instruction is transmitted from the mobile terminal 400 in the control system. Each of FIG. 9 and FIG. 11 to FIG. 14 illustrates a specific example of an image displayed on the touch panel 401 of the mobile terminal 400. Each of images is displayed on the touch panel 401 when the mobile terminal executes a program for a remote operation, and switched according to execution of the program. FIG. 10 illustrates an operation outline in the control system when a control instruction is transmitted from the mobile terminal 400.

As described with reference to FIG. 7, various operation buttons including the operation button 41 (the buttons 41a and 41b and the power button 41c) are displayed on the touch panel 401 of the mobile terminal 400. When a button for instructing to transmit a control instruction of the operation buttons is touched, an application of the mobile terminal 400 switches the display on the touch panel 401 from the image of FIG. 7 to the image of FIG. 9. The image of FIG. 9 includes an operation button 42 for inputting whether or not to allow transmission of a control instruction.

FIG. 10 illustrates one example of a flow of signals between the components in the control system. When the operation button 42 is touched, the mobile terminal 400 transmits a control instruction received as described above to the server 300 (step S1 of FIG. 10). The server 300 outputs, to the HEMS controller 100, a control signal (Set command) corresponding to the control instruction received from the mobile terminal 400 (step S2 of FIG. 10). This control signal includes an instruction to set the state of the electric appliance 200.

Figure 9:
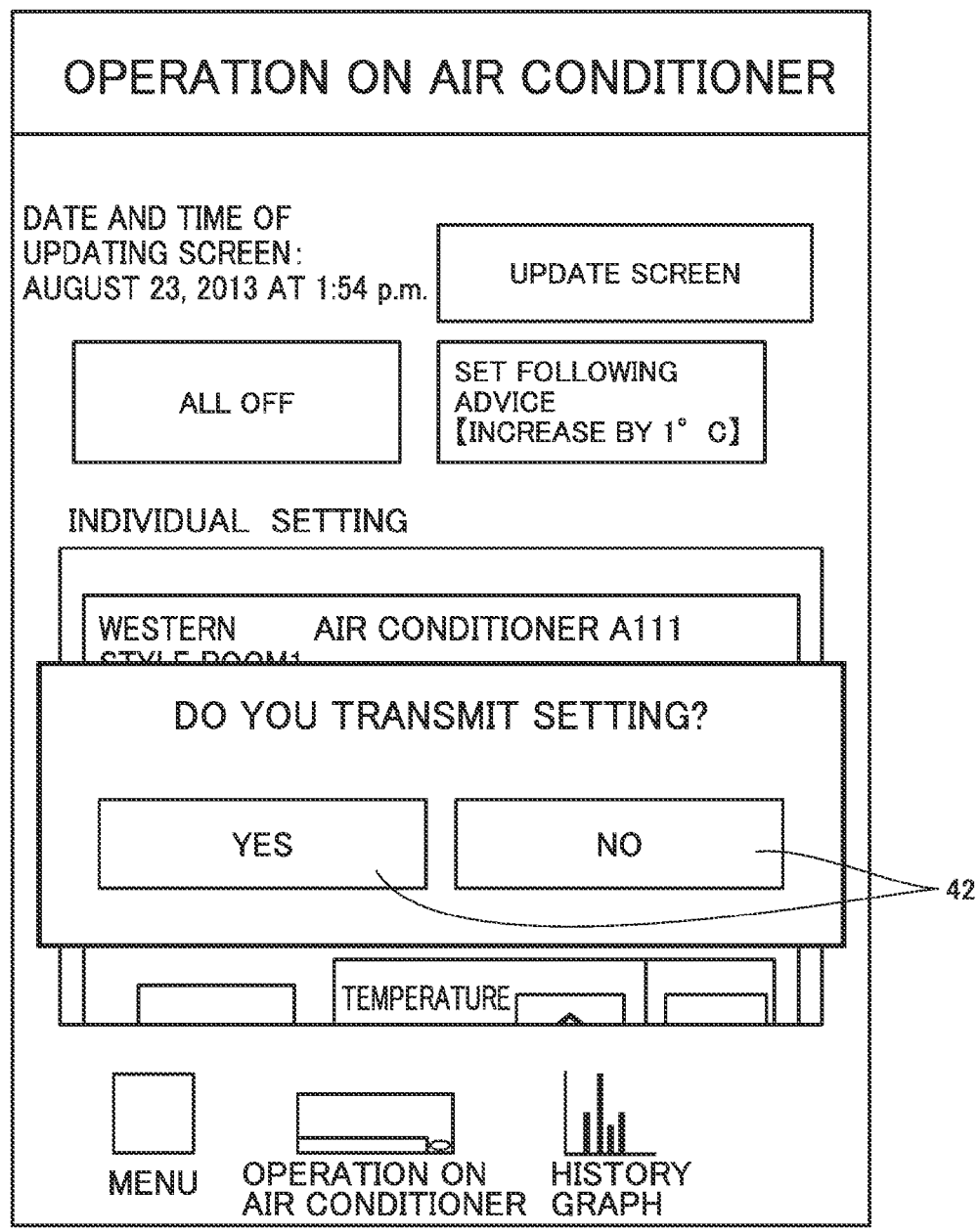
FIG. 9 illustrates one example of an image which is displayed on the touch panel of the mobile terminal.
Figure 10:
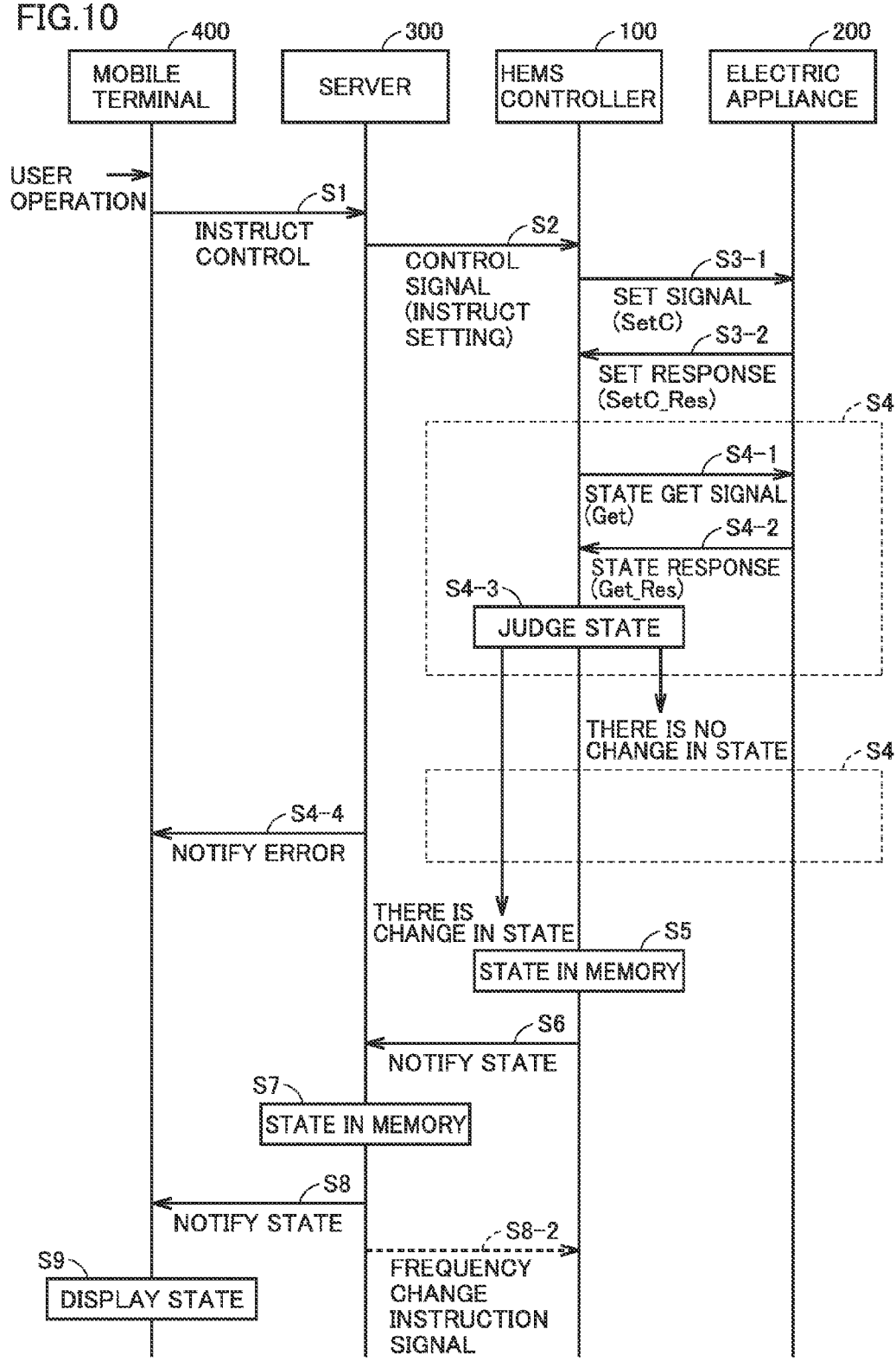
FIG. 10 illustrates an operation outline in the control system when a control instruction is transmitted from the mobile terminal.
Figure 11:
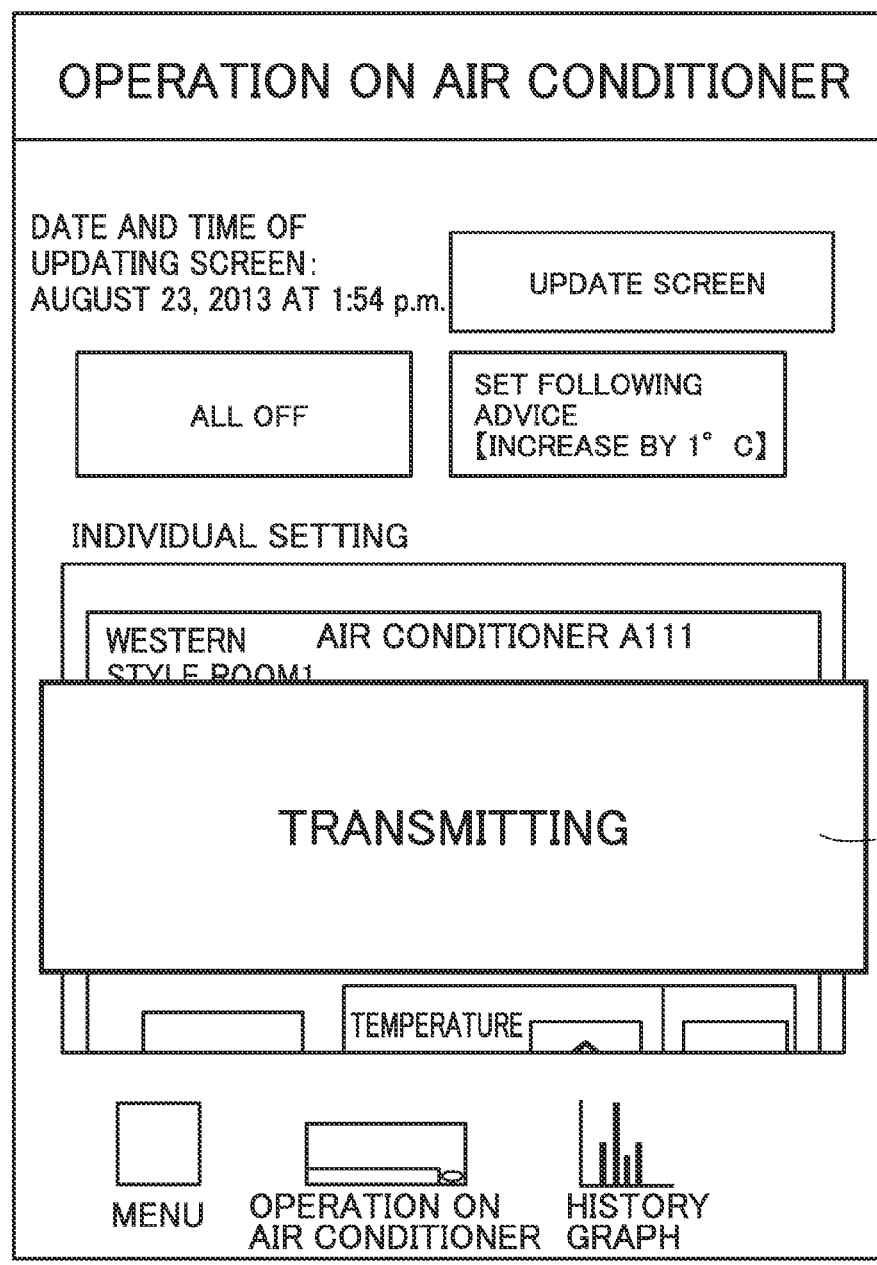
FIG. 11 illustrates one example of an image displayed on the touch panel of the mobile terminal.

After transmitting the control instruction to the server 300 at step S1, the application of the mobile terminal 400 switches the display on the touch panel 401 from the image of FIG. 9 to the image of FIG. 11. The image of FIG. 11 includes a display 43 indicating that the mobile terminal 400 waits for notification of the state of the electric appliance 200 from the server 300.

When receiving the control signal from the server 300, the HEMS controller 100 outputs a set signal (SetC) for performing setting (C) to the electric appliance 200 (step S3-1 of FIG. 10). This setting (C) is in accordance with the instruction included in the control signal transmitted from the server 300. When receiving the signal, the electric appliance 200 returns a signal indicating that the signal has been received (SetC_Res) to the HEMS controller 100 (step S3-2 of FIG. 10).

The HEMS controller 100 outputs the control signal to the electric appliance 200, and then performs state getting of the electric appliance 200 at a predetermined frequency (for example, at an interval of a time t2) (step S4 of FIG. 10). The HEMS controller 100 may execute the state getting after receiving the signal (SetC_Res) from the electric appliance 200.

The operation at step S4 is similar to the operation at step #1 (refer to FIG. 6). That is, the HEMS controller 100 transmits a state get signal (Get) to the electric appliance 200 to inquire the state (step S4-1 of FIG. 10). The electric appliance 200 transmits a response (Get_Res) thereto (step S4-2 of FIG. 10).

The HEMS controller 100 judges whether or not the state of the electric appliance 200 which has transmitted the response is changed from a state of the electric appliance 200, which is stored in the memory of the HEMS controller 100 (step S4 of FIG. 10). When judging that there is a change, the HEMS controller 100 stores the state in the memory (step S5 of FIG. 10) and notifies the server 300 of the state of the electric appliance 200 (step S6 of FIG. 10). When judging that there is no change, the HEMS controller 100 does not perform the notification to the server 300 as described above. Then, the HEMS controller 100 repeats the state getting of the electric appliance 200 at the aforementioned predetermined frequency.

The server 300 which has received the notification stores the state notified as the latest state of the electric appliance 200 in the memory of the server 300 (step S7 of FIG. 10) and performs notification to the mobile terminal 400 (step S8 of FIG. 10). This notification may use a so-called polling method by which the notification is performed in response to the inquiry to the server 300 from the mobile terminal 400 or a so-called push method by which the notification is performed when the server 300 receives notification of the state from the electric appliance 200.

Figure 12:
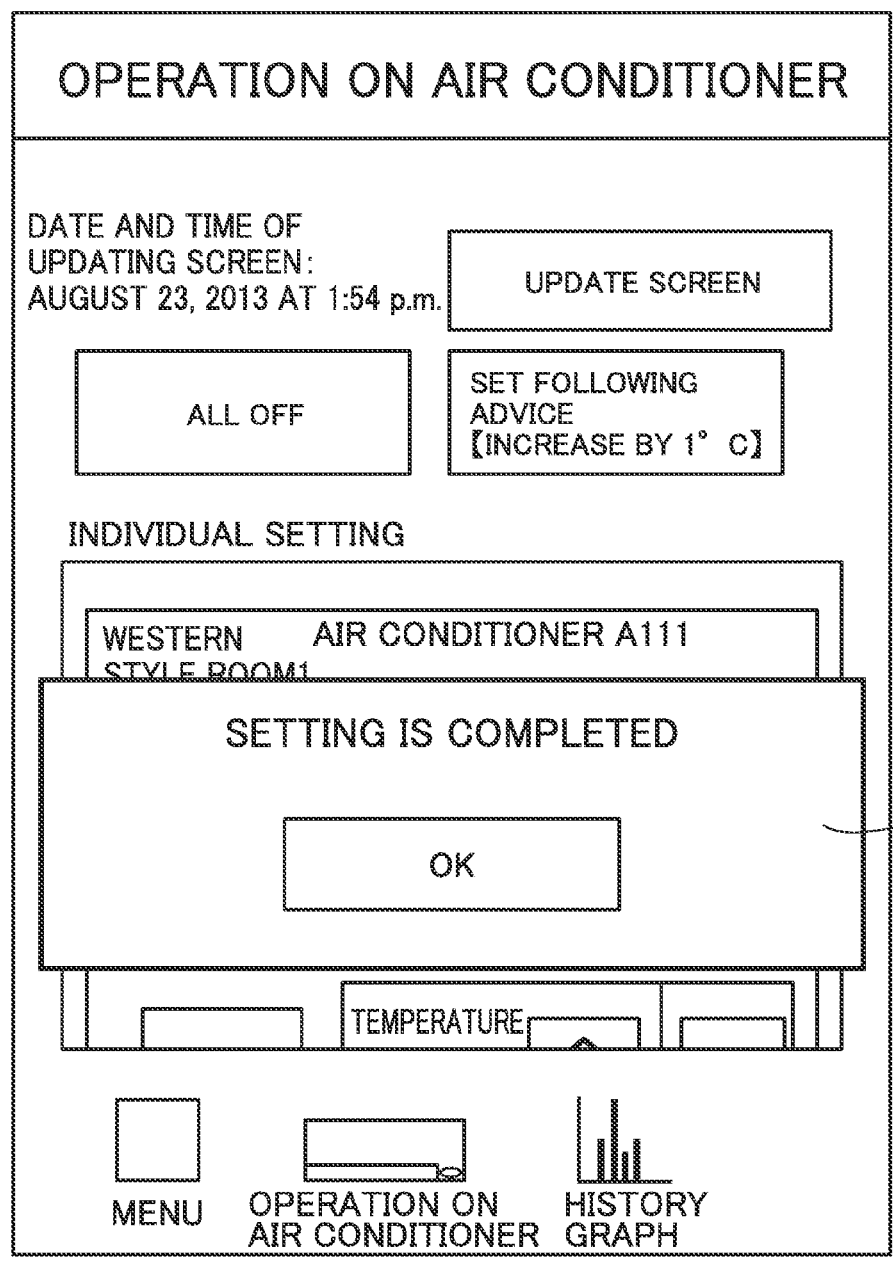
FIG. 12 illustrates one example of an image displayed on the touch panel of the mobile terminal.
Figure 13:
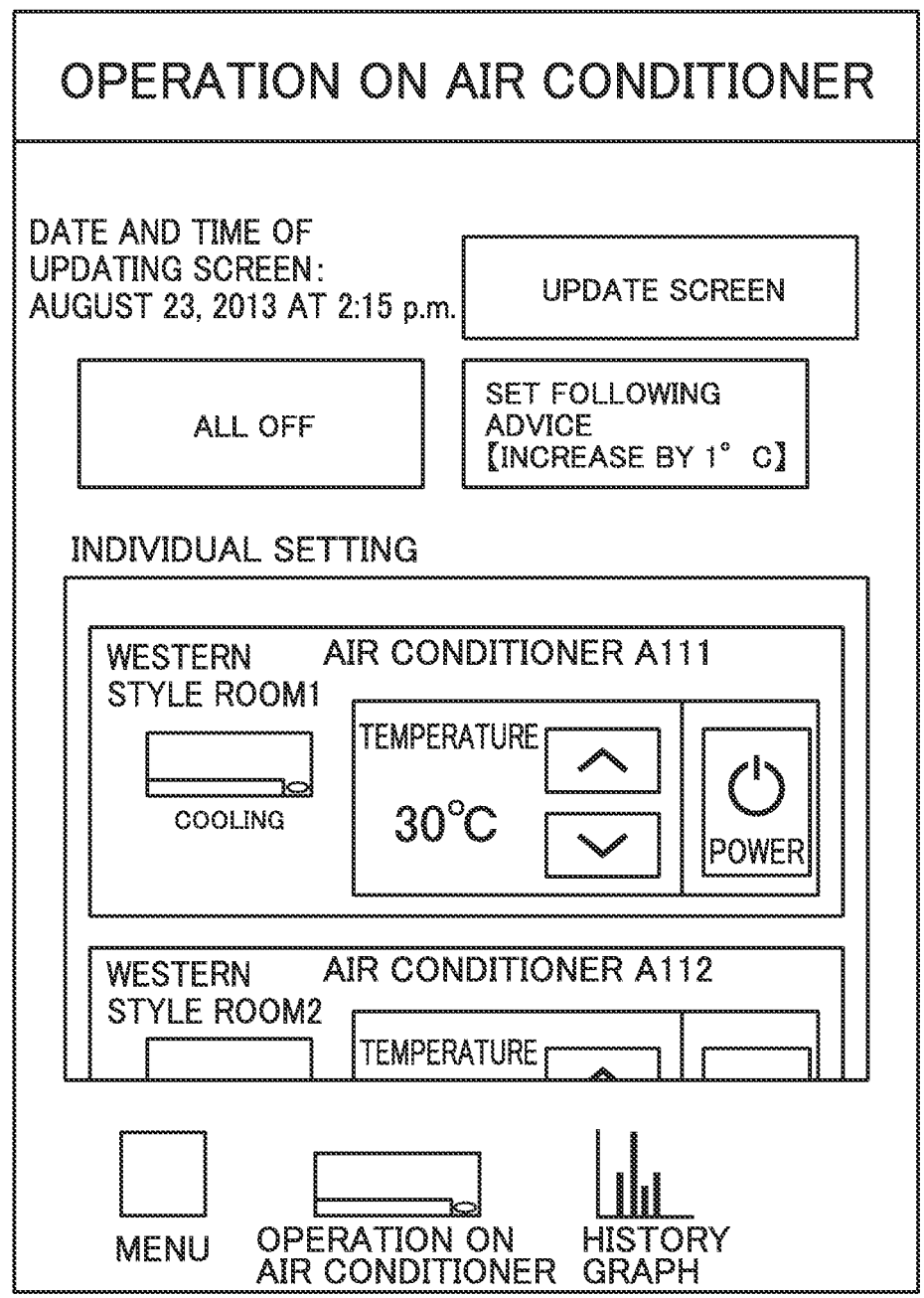
FIG. 13 illustrates one example of an image displayed on the touch panel of the mobile terminal.

When receiving the aforementioned notification, the application of the mobile terminal 400 switches the display on the touch panel 401 from the image of FIG. 11 to the image of FIG. 12. The image of FIG. 12 includes a display 44. The display 44 includes a message "Setting is completed." and reports that the notification indicating that the state of the electric appliance 200 is the state after setting is received from the server 300. More specifically, the display 44 reports that the state after setting of the electric appliance 200 is changed is in accordance with the instruction transmitted from the mobile terminal 400. When the display 44 is touched, the application of the mobile terminal 400 switches the display on the touch panel 401 from the image of FIG. 12 to the image of FIG. 13. The image of FIG. 13 includes a display of the state of the electric appliance 200, which is updated based on the notification from the server 300.

This makes it possible for the user to instruct setting change of the electric appliance 200 by a remote operation with use of the mobile terminal 400. The user is also able to remotely know that the state of the electric appliance 200 is changed in accordance with the setting change.

In the present control system, only when there is a change in the state of the electric appliance 200, the notification by means of communication from the HEMS controller 100 to the server 300 (communication via the Internet) is performed. Thus, the user is able to know a change in the state of the electric appliance 200 while reducing an amount of communication via the Internet.

When not receiving the notification of step S6 from the HEMS controller 100 in a predetermined response time period after the control instruction is given at step S1 above, the server 300 notifies the mobile terminal 400 of an error (step S4-4). This error notification is assumed to use a so-called polling method by which the notification is performed in response to the inquiry to the server 300 from the mobile terminal 400. Note that, this error notification may use a so-called push method by which the notification is automatically transmitted by the server 300 after the predetermined response time period has lapsed. The response time period may be defined depending on the electric appliance 200 to be a target, defined depending on details of the control instruction, or defined depending on a control load of the HEMS controller 100.

The error notification at step S4-4 may be performed based on judgement of the server 300 or may be performed based on judgment of the HEMS controller 100. In the former case, the server 300 performs the error notification based on the judgement as to whether or not the notification at step S6 is performed. In the latter case, the HEMS controller 100 judges whether or not the state of the electric appliance 200 is changed from a state of the electric appliance 200, which is stored in the memory of the HEMS controller 100, after the predetermined time period has lapsed. When judging that there is no change, the HEMS controller 100 performs error notification to the server 300. The server 300 performs the error notification of step S4-4 upon the reception of the error notification from the HEMS controller 100.

Figure 14:
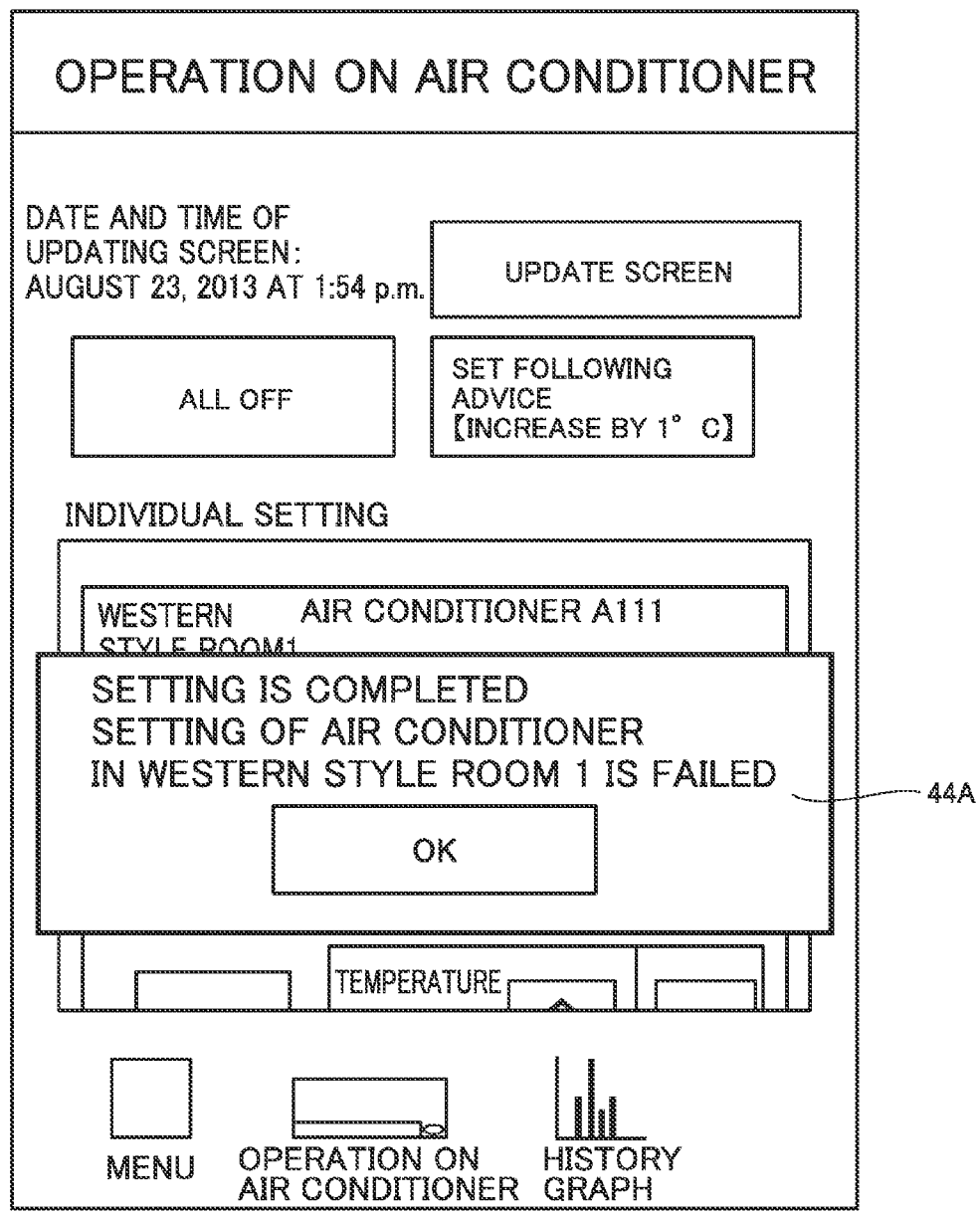
FIG. 14 illustrates one example of an image displayed on the touch panel of the mobile terminal.

When receiving the error notification of step S4-4 from the server 300, the application of the mobile terminal 400 switches the display on the touch panel 401 from the image of FIG. 11 to the image of FIG. 14. This reports, to a user, that there is no change in accordance with setting by an operation instruction in the electric appliance 200. That is, the image of FIG. 14 includes a display 44A. The display 44A reports that the state of the electric appliance 200 after the setting change is not notified from the server 300, that is, there is no change in accordance with the instruction of the setting change in the electric appliance 200. Thereby, the user is able to know that the setting change of the electric appliance 200 is failed. Preferably, the application of the mobile terminal 400 switches the display on the touch panel 401 from the image of FIG. 14 to the image of FIG. 7 when the display 44 is touched. This makes it possible for the user to give a control instruction again.

<9. Functional Configuration of HEMS Controller 100>

Figure 15:
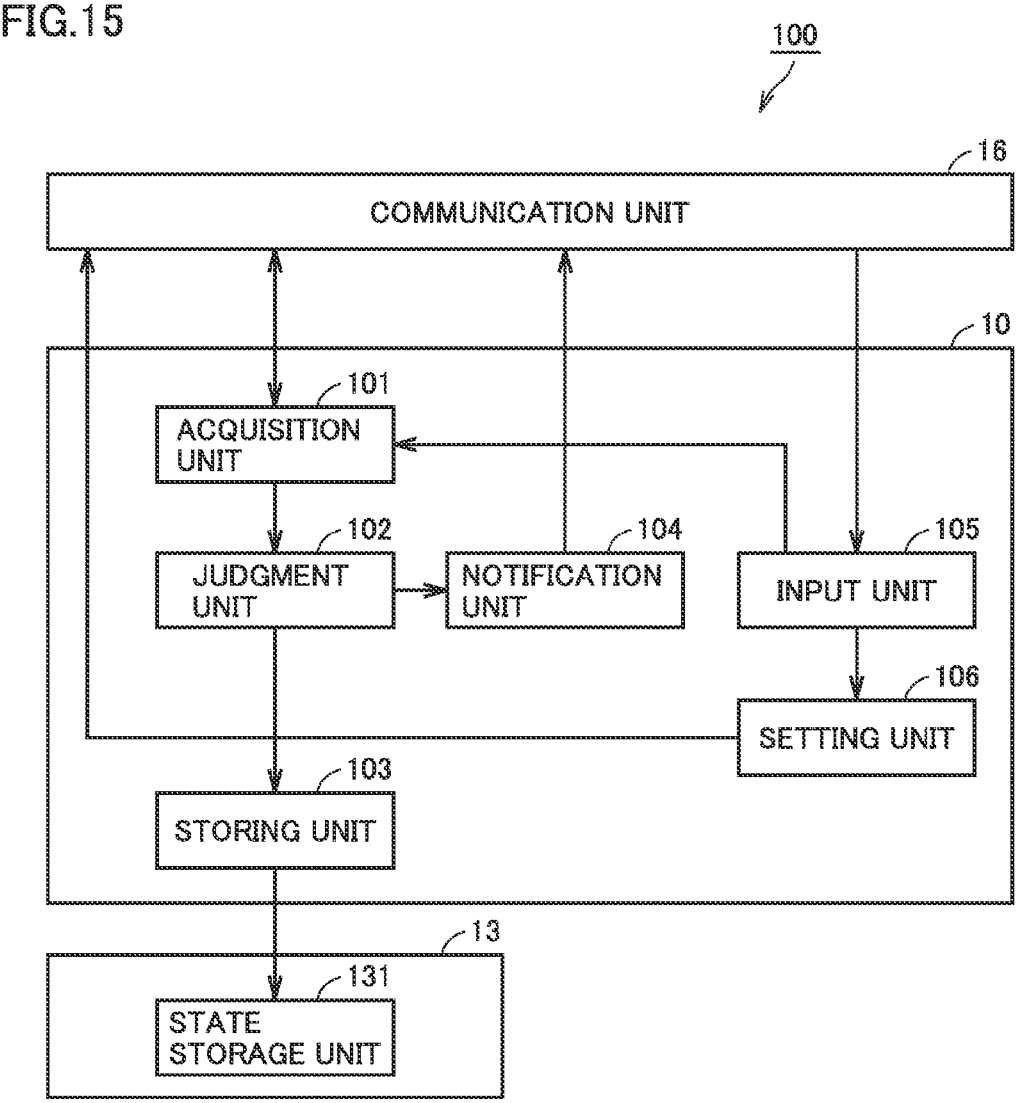
FIG. 15 is a block diagram illustrating a specific example of a functional configuration of the HEMS controller for performing the operation above.

FIG. 15 is a block diagram illustrating a specific example of a functional configuration of the HEMS controller 100 for performing the operation above. Functions of FIG. 15 are mainly realized by the CPU 10 of the HEMS controller 100 when the CPU 10 reads and executes the program stored in the memory on the RAM 12. At least a part of the functions may be realized by other components illustrated in FIG. 2 or hardware resources, such as an electric circuit, which is not illustrated.

With reference to FIG. 15, the storage device 13 includes a state storage unit 131 which is a storage area in which a current state of the electric appliance 200 is stored. When the HEMS controller 100 is able to manage two or more electric appliances 200, each of the current states of the two or more electric appliances 200 is stored.

Further, with reference to FIG. 15, the CPU 10 functions as an acquisition unit 101, a judgment unit 102, a storing unit (storage unit) 103, a notification unit 104, an input unit 105, and a setting unit 106.

The judgement unit 102 judges whether or not a state of the electric appliance is changed from a state stored in the state storage unit 131.

The storing unit (storage unit) 103 stores the state of the electric appliance 200 in the state storage unit 131.

When the state of the electric appliance is changed from the state stored in the state storage unit 131, the communication unit 104 notifies the server 300 of the state of the electric appliance via the communication unit 16.

The input unit 105 receives, via the communication unit 16 from the server 300, a control signal based on a control instruction from the mobile terminal 400 and an input of a frequency change instruction signal for instructing a change of a communication frequency with the electric appliance 200 at the acquisition unit 101.

The setting unit 106 sets the state of the electric appliance 200 in accordance with the control signal by performing communication with the electric appliance 200 via the communication unit 16.

<10. Processing Flow>

Next, processing executed by the HEMS controller 100 in the control of "operation outline when there is no instruction from mobile terminal 400 (2)" indicated in FIG. 8 will be described. In this processing, the HEMS controller 100 can count an automatic stop timer for each electric appliance 200. The automatic stop timer defines a time until the HEMS controller 100 transmits a control signal for "turning off the operation state of the electric appliance 200" described above after the HEMS controller 100 enters a state in which communication with the server 300 is not allowed.

Note that, in the present specification, terms of "start", "reset", and "clear (stop)" are used for operations associated with a timer. The "start" means starting a time counting operation by a timer with a timer expiration time as an initial value (for example, which is twenty-four hours, but is not limited to twenty-four hours). When the timer is started, the timer is operated. The "reset" means returning the timer expiration time to the initial value (for example, which is twenty-four hours, but is not limited to twenty-four hours). The "clear (step)" means stopping the timer. The timer is also operated after being reset, but is stopped when being cleared.

In the control of FIG. 8, the HEMS controller 100 executes processing for starting counting of the automatic stop timer (count start processing) and processing for transmitting the control signal for "turning off the operation state of the electric appliance 200" described above (specific signal transmission processing) based on the expiration of counting of the automatic stop timer. Each processing will be described below. Note that, the control signal for "turning off the operation state of the electric appliance 200" is referred to as a "specific control signal" below.

<11. Count Start Processing>

Figure 16:
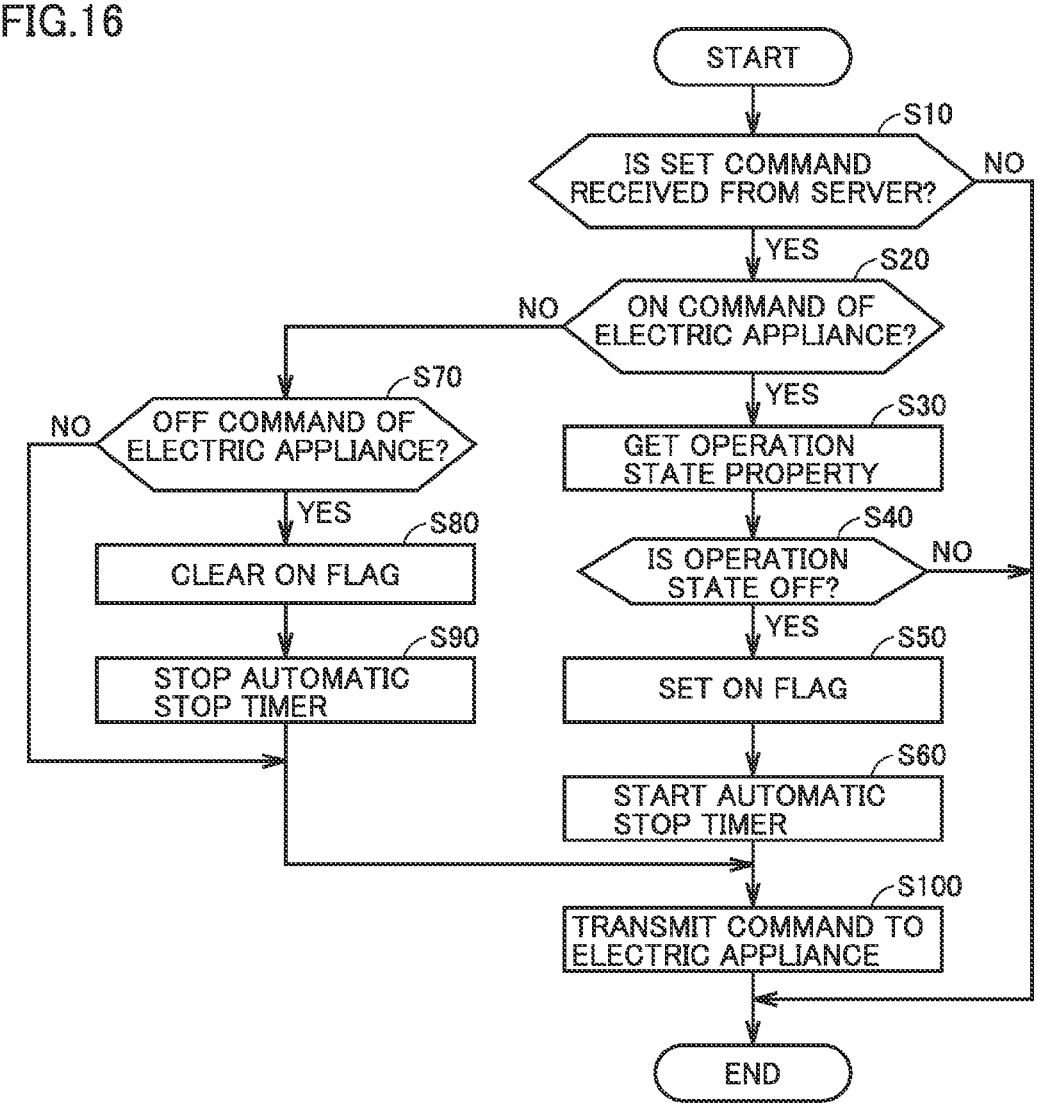
FIG. 16 is a flowchart of count start processing in the first embodiment.

FIG. 16 is a flowchart of count start processing in the first embodiment. The HEMS controller 100 starts the processing of FIG. 16, for example, at a fixed time interval.

With reference to FIG. 16, the HEMS controller 100 judges whether or not a set command is received from the server 300 at step S10. The set command is a control signal transmitted from the server 300 to the HEMS controller 100 at step S2 (refer to FIG. 10). When judging that the set command is received from the server 300 (YES at step S10), the HEMS controller 100 makes the control proceed to step S20.

On the other hand, when judging that the set command is not received from the server 300 (NO at step S10), the HEMS controller 100 ends the processing of FIG. 16 as it is. Thereby, counting of the automatic stop timer is not started in the processing of FIG. 16 that is executed this time. For example, when counting of the automatic stop timer is started before executing the present processing of FIG. 16, countdown of the automatic stop timer is continued.

At step S20, the HEMS controller 100 judges whether or not the command received at step S10 is a command (control signal) for turning on the power of the electric appliance 200. When judging that the command received at step S10 is a command for turning on the power of the electric appliance 200 (YES at step S20), the HEMS controller 100 makes the control proceed to step S30, and when judging as other command (NO at step S20), makes the control proceed to step S70.

At step S30, the HEMS controller 100 transmits a state get signal (Get) to the electric appliance 200 before transmitting the set command received at step S10. The state get signal (Get) is a signal for getting operation property of the electric appliance 200 as transmitted at step #1-1 of FIG. 6 or the like. Note that, at step S30, the HEMS controller 100 transmits the state get signal (Get) to the electric appliance 200 which is a target of the set command received at step S10. Further, at step S30, the HEMS controller 100 receives a response (Get_Res) to the state get signal (Get) from the electric appliance 200. Then, the control proceeds to step S40.

At step S40, the HEMS controller 100 judges whether the state of the electric appliance 200 which is a transmission destination of the state get signal (Get) at step S30 is the "power off" state. This judgment is based on details of the response (Get_Res) received at step S30. When judging that the state of the electric appliance 200 is the "power off" (YES at step S40), the HEMS controller 100 makes the control proceed to step S50, and when not (NO at step S40), ends the processing of FIG. 16 as it is.

The HEMS controller 100 sets an "ON flag" which is a flag of the state of the electric appliance 200 at step S50. The "ON flag" is a flag indicating whether the power of the electric appliance 200 is to be turned on by the command transmitted from the HEMS controller 100 to the electric appliance 200. The HEMS controller 100 is able to set/clear the "ON flag" for each of two or more electric appliances 200. More specifically, when transmitting a command for turning on the power (hereinafter, referred to as an "ON command" as appropriate) to the electric appliance 200, the HEMS controller 100 sets the "ON flag" of the electric appliance 200. Then, after transmitting a command for turning off the power (hereinafter, referred to as an "OFF command" as appropriate) to the electric appliance 200, the HEMS controller 100 clears the ON flag of the electric appliance 200. The storage device 13 has an area in which the state of the "ON flag" (set or clear) is stored. The "ON flag" set at step S50 is the "ON flag" of the electric appliance 200 which is the target of the set command received at step S10. Then, the control proceeds to step S60.

At step S60, the HEMS controller 100 starts an automatic stop timer. The automatic stop timer started at step S60 is an automatic stop timer of the electric appliance 200 which is the target of the set command received at step S10. Then, the control proceeds to step S100.

At step S70, the HEMS controller 100 judges whether the command received at step S10 is a command (control signal) for turning off the power of the electric appliance 200. When judging that the command received at step S10 is the command for turning off the power of the electric appliance 200 (YES at step S70), the HEMS controller 100 makes the control proceed to step S80, and when judging as other command (NO at step S70), makes the control proceed to step S100.

The HEMS controller 100 clears the "ON flag" at step S80. The "ON flag" of the electric appliance 200 which is the target of the set command received at step S10 is cleared at step S80. Then, the control proceeds to step S90.

The HEMS controller 100 stops count of the automatic stop timer at step S90. The automatic stop timer stopped at step S90 is an automatic stop timer of the electric appliance 200 which is the target of the set command received at step S10. Then, the control proceeds to step S100.

At step S100, the HEMS controller 100 transmits the control signal corresponding to the set command received at step S10 to the electric appliance 200 and ends the processing of FIG. 16. Thereby, the electric appliance 200 receives the control signal in accordance with the instruction transmitted from the server 300.

<12. Specific Signal Transmission Processing>

Figure 17:
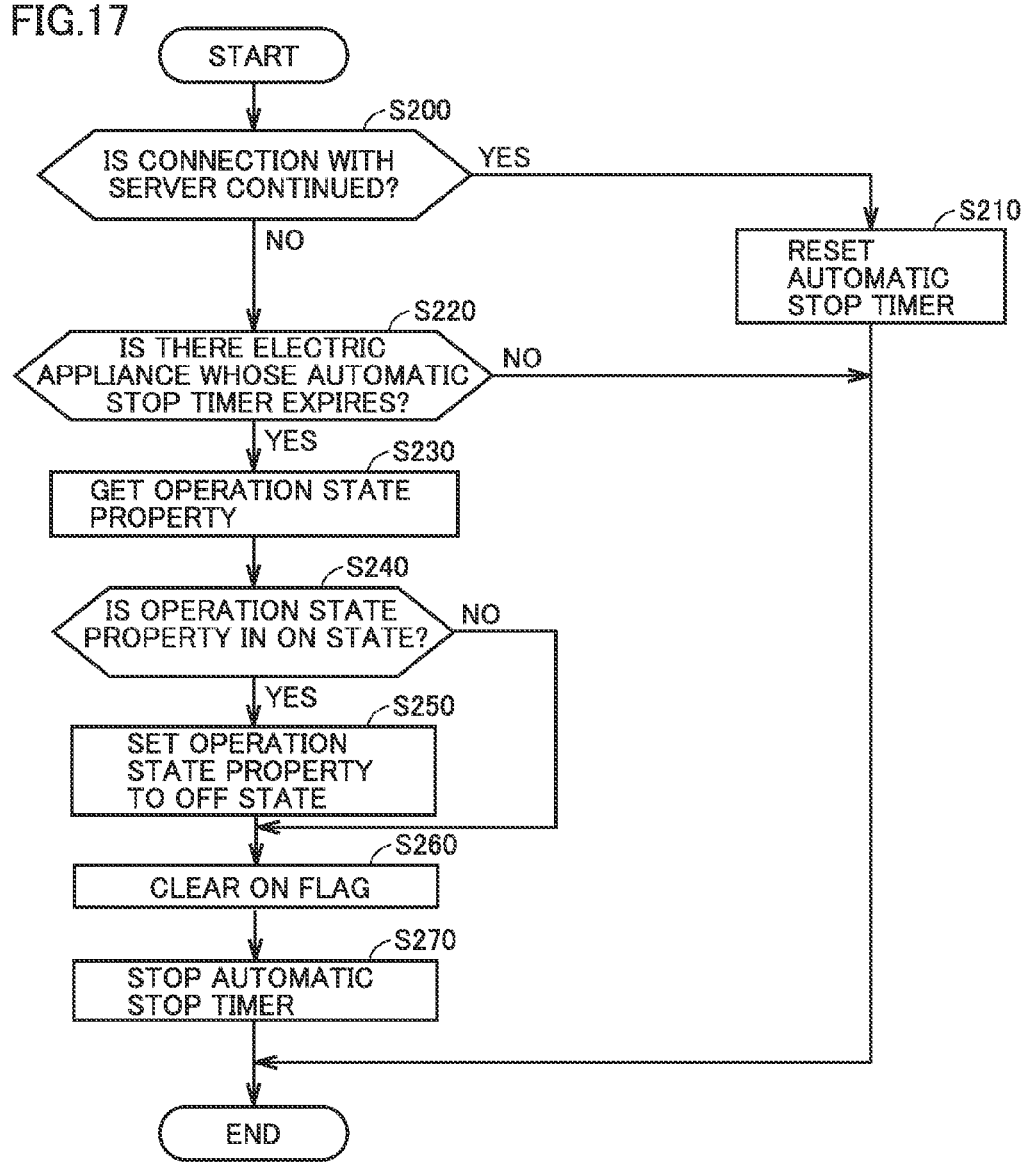
FIG. 17 is a flowchart of specific signal transmission processing in the first embodiment.

FIG. 17 is a flowchart of specific signal transmission processing in the first embodiment. The HEMS controller 100 starts the processing of FIG. 17, for example, at a predetermined time interval.

With reference to FIG. 17, the HEMS controller 100 judges whether connection with the server 300 is continued at step S200. The judgment at step S200 is performed with an aspect described with reference to steps #11-1, #11-2, and #12-1 of FIG. 8, for example. More specifically, the HEMS controller 100 transmits a continuation check signal to the server 300. When receiving a response signal to the continuation check signal from the server 300, the HEMS controller 100 judges that the connection with the server 300 is continued. On the other hand, when not receiving the response signal from the server 300 within a predefined time after transmitting the continuation check signal, the HEMS controller 100 judges that the connection with the server 300 is not continued. Then, when judging that the connection is continued (YES at step S200), the HEMS controller 100 makes the control proceed to step S210, and when judging that the connection is not continued (NO at step S200), makes the control proceed to step S220.

At step S210, the HEMS controller 100 resets the automatic stop timer started at step S60 and ends the processing of FIG. 17. At step S210, automatic stop timers of all the electric appliances 200 in which the count has been started are reset.

At step S220, the HEMS controller 100 judges whether there is an electric appliance 200 in which the count of the automatic stop timer expires among the electric appliances 200 in which the count of the automatic stop timer has been started at step S60. When judging that there is such an electric appliance 200 (YES at step S220), the HEMS controller 100 makes the control proceed to step S230, and when judging that there is not such an electric appliance 200 (NO at step S220), ends the processing of FIG. 17 as it is.

The HEMS controller 100 transmits a state get signal (Get) to the electric appliance 200 at step S230. The state get signal (Get) is a signal for getting operation property of the electric appliance 200 as transmitted at step #1-1 of FIG. 6 or the like. Note that, the state get signal of the electric appliance 200 which is judged as the count of the automatic stop timer thereof expires at step S220 is transmitted at step S230. The HEMS controller 100 receives a response (Get_Res) to the state get signal (Get) from the electric appliance 200. Then, the control proceeds to step S240.

At step S240, the HEMS controller 100 receives remote operation property of the electric appliance 200. Then, the HEMS controller 100 judges whether the state of the electric appliance 200 which is a transmission destination of the state get signal (Get) at step S230 is "power on". This judgment is based on details of the response (Get_Res) received at step S230. When judging that the state of the electric appliance 200 is the "power on" (YES at step S240), the HEMS controller 100 makes the control proceed to step S250, and when not (NO at step S240), makes the control proceed to step S260.

At step S250, the HEMS controller 100 sets the operation state property of the electric appliance 200 to which the state get signal is transmitted at step S230 to the off state. Then, the control proceeds to step S260.

At step S260, the HEMS controller 100 clears the ON flag of the electric appliance 200 to which the state get signal is transmitted at step S230. Then, the control proceeds to step S270.

At step S270, the HEMS controller 100 stops the automatic stop timer. Then, the HEMS controller 100 ends the processing of FIG. 17.

According to the processing of FIG. 17 described above, when connection between the HEMS controller 100 and the server 300 is not detected for a fixed time, the HEMS controller 100 transmits an OFF command to the electric appliance 200. The fixed time is, for example, a time measured by the "automatic stop timer", and a time period in which the HEMS controller 100 is connected to the server 300.

A length of the time measured by the "automatic stop timer" can be changed for each electric appliance 200. Accordingly, in the control system of the first embodiment, a length of time until an OFF command is transmitted after the connection is not able to be confirmed is able to be adjusted for each electric appliance 200.

The HEMS controller 100 receives an instruction from the mobile terminal 400 via the server 300. Thus, a situation in which the HEMS controller 100 is not able to be connected to the server 300 means a state in which the HEMS controller 100 is not able to receive an instruction from the mobile terminal 400. In the control system of the first embodiment, the HEMS controller 100 returns the electric appliance 200 to a specific state when such a state occurs.

<Flag Adjustment Processing (1)>

Figure 18:
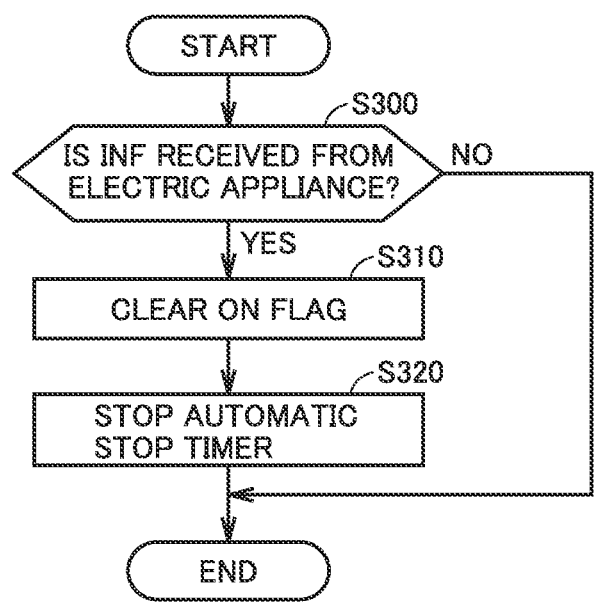
FIG. 18 is a flowchart of flag adjustment processing (1).

Setting of the ON flag used in the first embodiment may be changed when INF notification is received from the electric appliance 200. FIG. 18 is a flowchart of flag adjustment processing (1). The flag adjustment processing (1) is processing for adjusting setting of the ON flag based on INF notification from the electric appliance 200.

As illustrated in FIG. 18, the HEMS controller 100 starts the flag adjustment processing (1) upon reception of the INF notification (YES at step S300). Thereby, the control proceeds to step S310 and a step subsequent thereto. On the other hand, the HEMS controller 100 does nothing when not receiving the INF notification (NO at step S300).

The reception of the INF notification from the electric appliance 200 means that an operation of the electric appliance 200 is performed in a room. In such a case, the HEMS controller 100 does not need to automatically stop the electric appliance 200 after the automatic stop timer expires. Under such circumstances, when receiving the INF notification from the electric appliance 200, the HEMS controller 100 makes the control proceed to step S310 and a step subsequent thereto.

At step S310, the HEMS controller 100 clears the ON flag of the electric appliance 200 which is a transmission source of the INF notification received at step S300. Then, the control proceeds to step S320.

At step S320, the HEMS controller 100 resets the automatic stop timer of the electric appliance 200 which is the transmission source of the INF notification received at step S300 and ends the processing of FIG. 18.

That is, the HEMS controller 100 clears the ON flag of the electric appliance 200 which has received the INF notification.

Second Embodiment

In a control system of a second embodiment, when connection between the HEMS controller 100 and the server 300 is not detected, the HEMS controller 100 may immediately transmit an OFF command to the electric appliance 200 without waiting for lapse of the fixed time.

That is, in the specific signal transmission processing of the first embodiment, when it is judged at step S200 that connection between the HEMS controller 100 and the server 300 is not continued (NO at step S200), the control of step S220 is not executed, but the control of step S230 is executed. Thereby, the control of the control system can be further simplified.

Third Embodiment

In a control system of a third embodiment, the electric appliance 200 manages a value of "remote operation property" as a value of property of the electric appliance 200. The "remote operation property" indicates whether the electric appliance 200 operates in accordance with a remote operation. A possible value of the "remote operation property" is, for example, "via public line" and "direct operation". The value "via public line" means that the electric appliance 200 operates in accordance with a control instruction transmitted from the HEMS controller 100, that is, an instruction transmitted from the mobile terminal 400 via the Internet. The value "direct operation" means that the electric appliance 200 operates in accordance with a direct instruction from the operation unit 27.

In the control system of the third embodiment, the HEMS controller 100 transmits a set signal which is one example of a control signal, and a control signal for instructing to set the "via public line" as the value of the "remote operation property". In response thereto, the electric appliance 200 sets "via public line" as the value of the "remote operation property". After that, when the electric appliance 200 operates in accordance with an instruction input to the operation unit 27, the electric appliance 200 changes the value of the "remote operation property" to the "direct operation".

When detecting that connection with the server 300 is not continued, the HEMS controller 100 transmits an OFF command to the electric appliance 200 on the condition that the value of the "remote operation property" of the electric appliance 200 is the "via public line".

Figure 19:
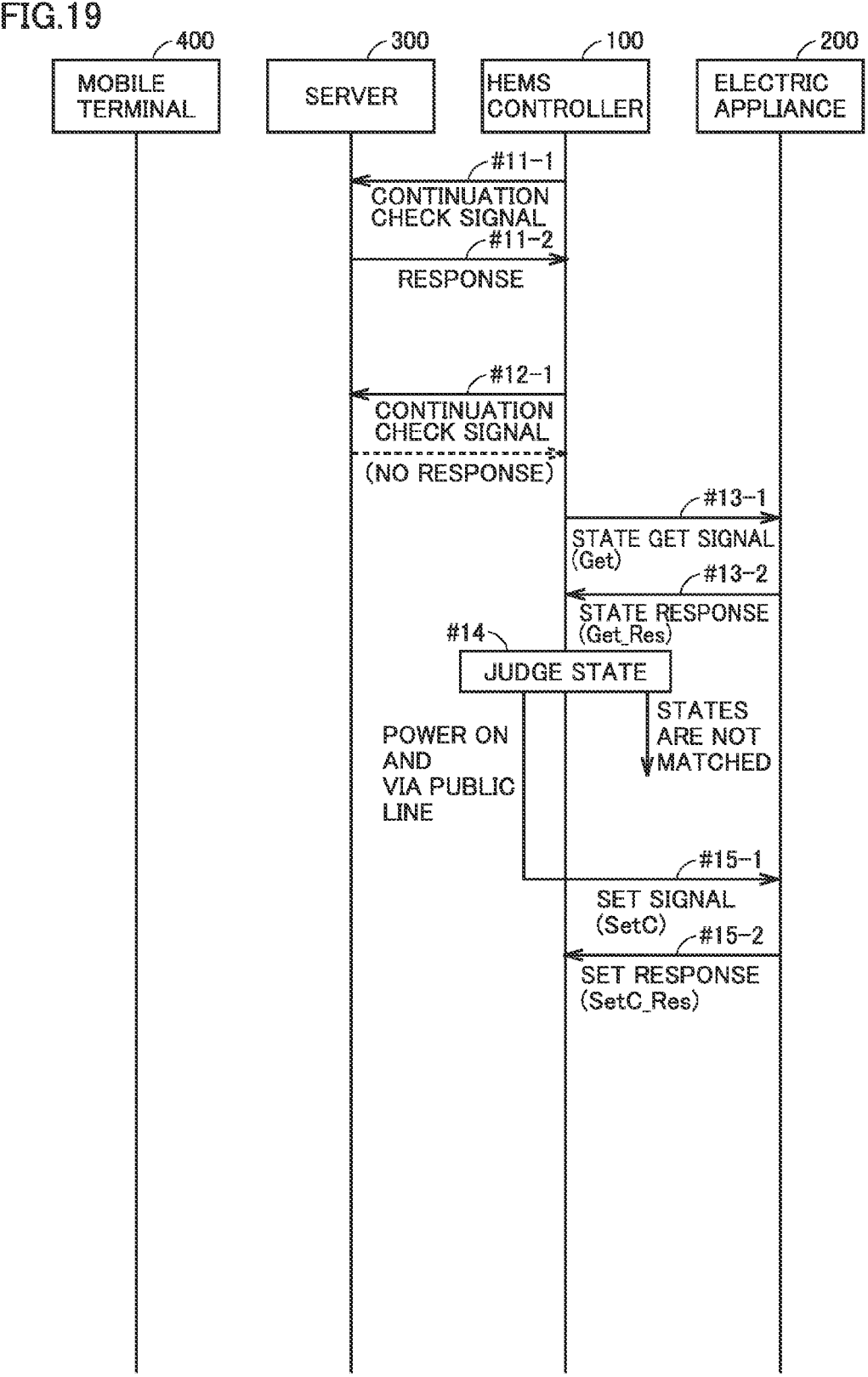
FIG. 19 illustrates a modified example of the operation outline of FIG. 8.

FIG. 19 illustrates a modified example of the operation outline of FIG. 8. In the control system of the third embodiment, the HEMS controller 100 makes the control proceed to step #15-1 on the condition that the state of the electric appliance 200 is the power on and the value of the "remote operation property" of the electric appliance 200 is the "via public line" at step #14. Then, the HEMS controller 100 transmits the "OFF command" to the electric appliance 200 at step #15-1.

The HEMS controller 100 sets the operation state property of the electric appliance 200 whose value of the "remote operation property" is other than the "via public line", to the off state.

Each processing (count start processing, specific signal transmission processing, and flag adjustment processing (2)) executed in the third embodiment will be described below.
<Count Start Processing>

Figure 20:
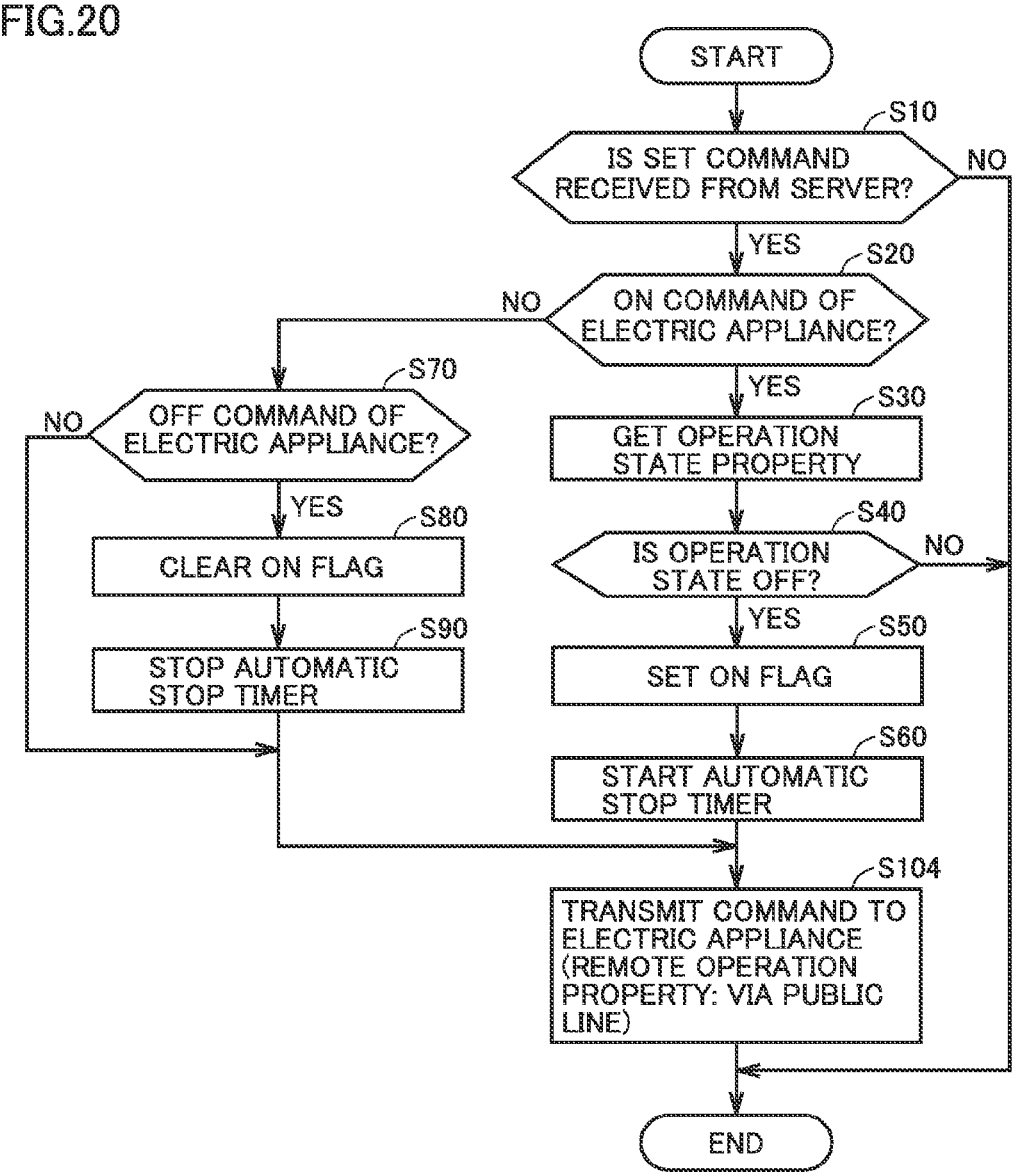
FIG. 20 is a flowchart of count start processing in a third embodiment.

FIG. 20 is a flowchart of the count start processing in the third embodiment. In comparison to the flowchart of FIG. 16, in the third embodiment, the HEMS controller 100 executes control of step S104 instead of step S100.

At step S104, the HEMS controller 100 transmits, to the electric appliance 200, a control signal corresponding to the command received at step S10 and a control signal instructing to set the value of the remote operation property to the "via public line".
<Flag Adjustment Processing (2)>

Figure 21:
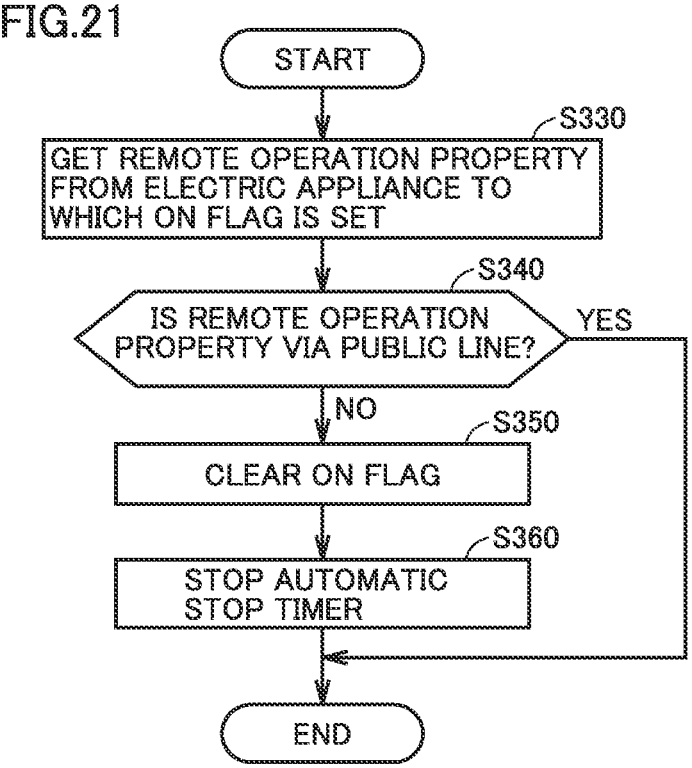
FIG. 21 is a flowchart of flag adjustment processing (2).

FIG. 21 is a flowchart of flag adjustment processing (flag adjustment processing (2)) in the third embodiment. The flag adjustment processing (2) is executed, for example, at a fixed time interval.

With reference to FIG. 21, at step S330, the HEMS controller 100 transmits a state get signal (Get) for inquiring remote operation property to each of electric appliances 200 to which the ON flag is set. Then, the control proceeds to step S340.

At step S340, the HEMS controller 100 judges whether the value of the remote operation property of each of the electric appliances 200 to which the state get signal (Get) is transmitted at step S330 is the "via public line". Then, the HEMS controller 100 ends the processing of FIG. 21 for the electric appliance 200 whose value of the remote operation property is the "via public line" (YES at step S340). On the other hand, the HEMS controller 100 makes the control proceed to step S350 for the electric appliance 200 whose value of the remote operation property is other than "via public line".

At step S350, the HEMS controller 100 clears the ON flag of the electric appliance 200 which is a target of the control at step S350. Then, the control proceeds to step S360.

At step S360, the HEMS controller 100 stops the automatic stop timer of the electric appliance 200 which is a target of the control at step S360 and ends the processing of FIG. 21.

That is, the HEMS controller 100 inquires electric appliances 200 about the value of the remote operation property. Then, the ON flag of the electric appliance 200 whose value of the remote operation property is a value other than the "via public line" (that is, "not via public line") is cleared and the automatic stop timer thereof is stopped. When an operation of the electric appliance 200 is performed from a room, the electric appliance 200 sets the value of the remote operation property to the "not via public line". That is, the fact that the value of the remote operation property is returned to the "not via public line" means that an operation of the electric appliance 200 is performed from a room. In such a case, the HEMS controller 100 does not need to automatically stop the electric appliance 200 after the automatic stop timer expires. Under such circumstances, the HEMS controller 100 clears the ON flag of the electric appliance 200 whose value of the remote operation property is the "not via public line".

<Specific Signal Transmission Processing>

Figure 22:
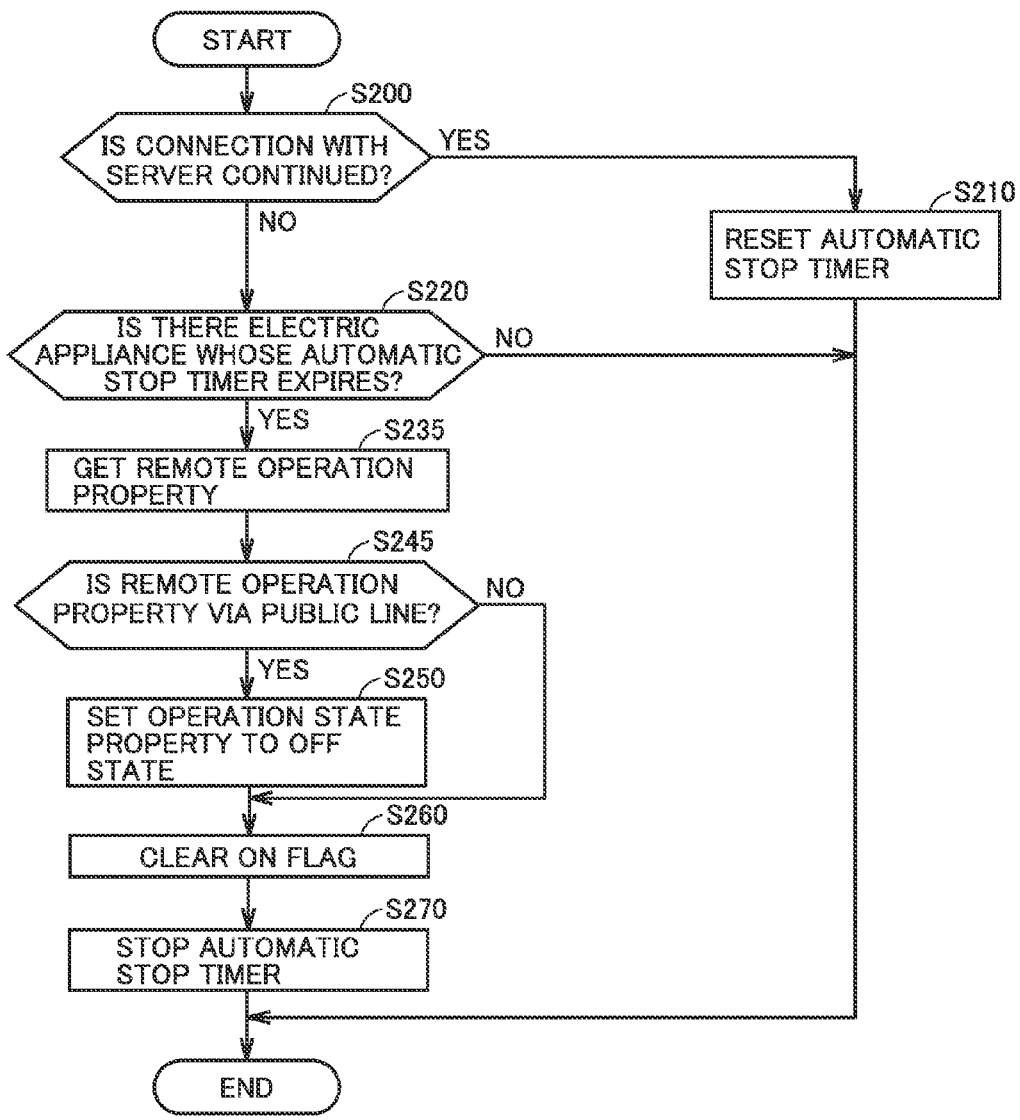
FIG. 22 is a flowchart of specific signal transmission processing in the third embodiment.

FIG. 22 is a flowchart of specific signal transmission processing in the third embodiment. When the flowchart of FIG. 22 is compared to the flowchart of FIG. 17, in the specific signal transmission processing of the third embodiment, the HEMS controller 100 executes control of step S235 instead of the controls of step S230 and executes control of step S245 instead of the control of step S240.

More specifically, when judging that there is an electric appliance 200 whose automatic stop timer expires at step S220 (YES at step S220), the HEMS controller 100 makes the control proceed to step S235. At step S235, the HEMS controller 100 acquires remote operation property of the electric appliance 200 whose automatic stop timer expires. Then, at step S245, the HEMS controller 100 judges whether the value of the remote operation property acquired at step S235 is the "via public line". Further, when judging that the value of the remote operation property is the "via public line" (YES at step S245), the HEMS controller 100 makes the control proceed to step S250, and when judging that the value of the remote operation property is other than the "via public line" (NO at step S245), makes the control proceed to step S260.

At step S250, the HEMS controller 100 sets the operation state of the electric appliance 200 whose remote operation property is judged as the "via public line" at step S245 to the off state. Then, the control proceeds to step S260.

At step S260, the HEMS controller 100 clears the ON flag of the electric appliance 200 whose automatic stop timer is judged as being expired at step S220. Then, the control proceeds to step S270.

At step S270, the HEMS controller 200 stops the automatic stop timer of the electric appliance 200 whose automatic stop timer is judged as being expired at step S220 and ends the processing of FIG. 22.

That is, the HEMS controller 100 clears the ON flag of the electric appliance 200 whose connection with the server 300 has been discontinued for a measuring time or more of the automatic stop timer (step S260). The HEMS controller 100 sets the operation state property of the electric appliance 200 whose value of the remote operation property is the "via public line" to the off state (step S250).

The disclosed embodiments and modified examples thereof should be considered to be given as examples and not limited on every point. The scope of the present disclosure is indicated not by the above description, but by the scope of the claims, and any modification in the meaning and within the scope equivalent to the scope of the claims is intended to be included.

REFERENCE SIGNS LIST 10, 20, 30 CPU
100 HEMS controller
200 electric appliance
300 server
400 mobile terminal

The invention claimed is:

1. A controller for transmitting a control signal to an electric appliance, the controller comprising:
   a communication unit for receiving, from a server, an instruction to the electric appliance, which is transmitted from a mobile terminal;
   a storage unit for storing the control signal to the electric appliance; and
   a processor, wherein
   the processor is configured to transmit an instruction to the electric appliance, which is received from the communication unit, to the electric appliance;
   the processor is configured to, determine whether the connection with the server is discontinued, and when the connection is discontinued, obtain a current state of the electric appliance;
   the processor is further configured to, when the current state is not a specific state of the electric appliance, transmit, to the electric appliance, a control signal which is stored in the storage unit and corresponds to the specific state of the electric appliance.

2. The controller according to claim 1, wherein the processor is configured to transmit the control signal corresponding to the specific state to the electric appliance on condition that a state in which connection with the server is not continued is maintained for a fixed time or more.

3. The controller according to claim 1, wherein the processor is configured to, when judging that connection with the server is not continued, transmit the control signal corresponding to the specific state to the electric appliance on condition that a state of the electric appliance is a state in accordance with the instruction transmitted from the server via the processor.

4. The controller according to claim 1, wherein the instruction to the electric appliance located in a predetermined area is transmitted from the mobile terminal located outside of the predetermined area.

5. The controller according to claim 1, wherein the electric appliance is a lighting equipment, and wherein the specific state of the electric appliance is providing a predetermined illumination level.

6. A control system, comprising:
   a server;
   a mobile terminal capable of communication with the server; and
   a controller for transmitting a control signal to an electric appliance based on an instruction received via the server, wherein:
   the mobile terminal is configured to transmit an instruction to the electric appliance,
   the server is configured to transmit, to the controller, the instruction received from the mobile terminal, and
   the controller is configured to:
   transmit the instruction to the electric appliance, which is received from the server, to the electric appliance;
   the controller is configured to, determine whether the connection with the server is discontinued, and when the connection is discontinued, obtain a current state of the electric appliance;
   the controller is further configured to, when the current state is not a specific state of the electric appliance, transmit a control signal corresponding to the specific state to the electric appliance.

7. The control system according to claim 6, wherein the instruction to the electric appliance located in a predetermined area is transmitted from the mobile terminal located outside of the predetermined area.

8. The control system according to claim 6, wherein the electric appliance is a lighting equipment, and wherein the specific state of the electric appliance is providing a predetermined illumination level.

9. A method for controlling a control system which includes a server, a mobile terminal capable of communication with the server, and a controller for transmitting a control signal to an electric appliance based on an instruction received via the server, wherein
the mobile terminal is configured to transmit an instruction to the electric appliance, and
the server is configured to transmit, to the controller, the instruction received from the mobile terminal,
the method for controlling the control system comprising:
a step in which the controller transmits the instruction to the electric appliance, which is received from the server, to the electric appliance,
a step in which the controller judges whether connection with the server is continued, and
a step in which the controller is configured to, determine whether the connection with the server is discontinued, and when the connection is discontinued, obtain a current state of the electric appliance;
the controller is further configured to, when the current state is not a specific state of the electric appliance, transmits a control signal corresponding to the specific state to the electric appliance.

10. The method according to claim 9, wherein the instruction to the electric appliance located in a predetermined area is transmitted from the mobile terminal located outside of the predetermined area.

11. The method according to claim 9, wherein the electric appliance is a lighting equipment, and wherein the specific state of the electric appliance is providing a predetermined illumination level.

* * * * *